(12) United States Patent
Wadley et al.

(10) Patent No.: US 10,184,759 B2
(45) Date of Patent: Jan. 22, 2019

(54) LIGHTWEIGHT BALLISTIC RESISTANT ANTI-INTRUSION SYSTEMS AND RELATED METHODS THEREOF

(71) Applicant: University of Virginia Patent Foundation, Charlottesville, VA (US)

(72) Inventors: Haydn N. G. Wadley, Keswick, VA (US); Vikram Deshpande, Cambridge (GB)

(73) Assignee: University of Virgina Patent Foundation, Charlottesville, VA (US)

(*) Notice: Subject to any disclaimer, the term of this patent is extended or adjusted under 35 U.S.C. 154(b) by 0 days.

(21) Appl. No.: 15/354,620

(22) Filed: Nov. 17, 2016

(65) Prior Publication Data

US 2017/0138703 A1    May 18, 2017

Related U.S. Application Data

(60) Provisional application No. 62/256,504, filed on Nov. 17, 2015.

(51) Int. Cl.
*F41H 5/04* (2006.01)
*B32B 5/02* (2006.01)
(Continued)

(52) U.S. Cl.
CPC ............ *F41H 5/0485* (2013.01); *B32B 3/12* (2013.01); *B32B 5/024* (2013.01); *F41H 5/24* (2013.01);
(Continued)

(58) Field of Classification Search
CPC .......... F41H 5/0485; F41H 5/24; F41H 5/013; F41H 7/00; B32B 3/12; B32B 5/024;
(Continued)

(56) References Cited

U.S. PATENT DOCUMENTS 4,911,061 A * 3/1990 Pivitt ................. F41H 5/0435
109/84
5,534,314 A   7/1996 Wadley
(Continued)

FOREIGN PATENT DOCUMENTS

WO    WO 1998/01596     1/1998
WO    WO 1999/65626    12/1999
(Continued)

OTHER PUBLICATIONS

Attwood et al, "Mechanisms of the penetration of ultra-high molecular weight polyethylene composite beams", Journal of Impact Engineering, 2016, pp. 153-165, vol. 93, Published by Elsevier, Amsterdam.
(Continued)

*Primary Examiner* — Bret Hayes
(74) *Attorney, Agent, or Firm* — Robert J. Decker

(57) ABSTRACT

A method for manufacturing a ballistic resistance package which includes providing a molecularly oriented tape material having a front face and back face with a minimum of two sets of parallel side faces; wrapping molecularly oriented fabric material around the front and back faces and a set of the parallel side faces of the molecularly oriented tape material, yielding a wrapped core structure; and finalizing the wrapped core structure to yield the ballistic resistance package. A multifunction ballistic resistance system for resisting projectiles and/or mitigating blast effects of explosions. The multifunction ballistic resistance system may include: at least one cellular frame defining cells therein, and a plurality of molecularly oriented tape material core structures wrapped in molecularly oriented fabric material and finalized, and attached to at least one cellular frame.

36 Claims, 14 Drawing Sheets

(51) Int. Cl.
  *F41H 7/00* (2006.01)
  *F41H 5/24* (2006.01)
  *F41H 5/013* (2006.01)
  *B32B 3/12* (2006.01)
  *B32B 37/12* (2006.01)

(52) U.S. Cl.
  CPC .............. *B29K 2223/065* (2013.01); *B29K 2995/0089* (2013.01); *B32B 2571/02* (2013.01); *B32B 2605/08* (2013.01); *B32B 2605/12* (2013.01); *B32B 2605/18* (2013.01); *F41H 5/013* (2013.01)

(58) Field of Classification Search
  CPC ... B32B 7/12; B32B 2605/08; B32B 2605/12; B32B 2605/18; B32B 2571/02
  USPC .......... 89/36.02, 36.04, 36.07–36.09, 36.11, 89/36.12, 36.15
  See application file for complete search history.

(56) References Cited

U.S. PATENT DOCUMENTS

| | | | |
|---|---|---|---|
| 5,736,073 | A | 4/1998 | Wadley |
| 6,478,931 | B1 | 11/2002 | Wadley |
| 7,014,889 | B2 | 3/2006 | Groves |
| 7,204,183 | B2 * | 4/2007 | Cirillo .................. F42D 5/045 206/3 |
| 7,211,348 | B2 | 5/2007 | Wadley |
| 7,288,326 | B2 | 10/2007 | Elzey |
| 7,357,062 | B2 | 4/2008 | Joynt |
| 7,401,643 | B2 | 7/2008 | Queheillalt |
| 7,424,967 | B2 | 9/2008 | Ervin |
| 7,669,799 | B2 | 3/2010 | Elzey |
| 7,718,222 | B2 | 5/2010 | Hass |
| 7,879,411 | B2 | 2/2011 | Hass |
| 7,913,611 | B2 | 3/2011 | Terry |
| 7,963,085 | B2 | 6/2011 | Sypeck |
| 7,976,932 | B1 * | 7/2011 | Lyons .................. B32B 5/12 139/383 R |
| 8,084,086 | B2 | 12/2011 | Hass |
| 8,110,143 | B2 | 2/2012 | Rabiei |
| 8,124,178 | B2 | 2/2012 | Hass |
| 8,146,478 | B2 | 4/2012 | Joynt |
| 8,176,635 | B2 | 5/2012 | Queheillalt |
| 8,247,333 | B2 | 8/2012 | Sypeck |
| 8,650,756 | B2 | 2/2014 | Wadley |
| 8,784,512 | B2 | 7/2014 | Wadley |
| 9,745,736 | B2 | 8/2017 | Wadley |
| 9,921,037 | B2 | 3/2018 | Wadley |
| 2003/0054133 | A1 | 3/2003 | Wadley |
| 2005/0202206 | A1 | 9/2005 | Wadley |
| 2005/0255289 | A1 | 11/2005 | Wadley |
| 2005/0266163 | A1 | 12/2005 | Wortman |
| 2005/0287296 | A1 | 12/2005 | Wadley |
| 2006/0048640 | A1 * | 3/2006 | Terry .................. F41H 5/0414 89/36.02 |
| 2006/0062912 | A1 | 3/2006 | Wortman |
| 2006/0080835 | A1 | 4/2006 | Kooistra |
| 2007/0232168 | A1 * | 10/2007 | Pilpel .................. B32B 5/26 442/135 |
| 2007/0269716 | A1 | 11/2007 | Wadley |
| 2008/0006353 | A1 | 1/2008 | Elzey |
| 2008/0131611 | A1 | 6/2008 | Hass |
| 2008/0135212 | A1 | 6/2008 | Queheillalt |
| 2009/0274865 | A1 | 11/2009 | Wadley |
| 2010/0104819 | A1 | 4/2010 | Wadley |
| 2010/0236759 | A1 | 9/2010 | Wadley |
| 2011/0107904 | A1 | 5/2011 | Queheillalt |
| 2011/0250385 | A1 | 10/2011 | Sypeck |
| 2011/0318498 | A1 | 12/2011 | Wadley |
| 2012/0137974 | A1 | 6/2012 | Hass |
| 2012/0160166 | A1 | 6/2012 | Hass |
| 2012/0193940 | A1 | 8/2012 | Tunis |
| 2012/0285114 | A1 | 11/2012 | Queheillalt |
| 2013/0014916 | A1 | 1/2013 | O'Masta |
| 2013/0263727 | A1 * | 10/2013 | O'Masta .................. F41H 5/023 89/36.02 |
| 2016/0068957 | A1 | 3/2016 | Wadley |
| 2016/0208372 | A1 | 7/2016 | Wadley |
| 2016/0376691 | A1 | 12/2016 | Wadley |
| 2017/0028674 | A1 | 2/2017 | Wadley |
| 2017/0029968 | A1 | 2/2017 | Wadley |
| 2017/0268095 | A1 | 9/2017 | Wadley |

FOREIGN PATENT DOCUMENTS

| | | |
|---|---|---|
| WO | WO 2001/090438 | 11/2001 |
| WO | WO 2001/092001 | 12/2001 |
| WO | WO 2002/006747 | 1/2002 |
| WO | WO 2002/015300 | 2/2002 |
| WO | WO 2002/087787 | 11/2002 |
| WO | WO 2002/098644 | 12/2002 |
| WO | WO 2003/018853 | 3/2003 |
| WO | WO 2003/028428 | 10/2003 |
| WO | WO 2003/091473 | 11/2003 |
| WO | WO 2003/101721 | 12/2003 |
| WO | WO 2003/101722 | 12/2003 |
| WO | WO 2004/011245 | 2/2004 |
| WO | WO 2004/011688 | 2/2004 |
| WO | WO 2004/022868 | 3/2004 |
| WO | WO 2004/022869 | 3/2004 |
| WO | WO 2004/043691 | 5/2004 |
| WO | WO 2004/048632 | 6/2004 |
| WO | WO 2005/014216 | 2/2005 |
| WO | WO 2005/047202 | 5/2005 |
| WO | WO 2005/089107 | 9/2005 |
| WO | WO 2007/005832 | 1/2007 |
| WO | WO 2007/139814 | 12/2007 |
| WO | WO 2008/127301 | 10/2008 |
| WO | WO 2008/131105 | 10/2008 |
| WO | WO 2009/023744 | 2/2009 |
| WO | WO 2009/048676 | 4/2009 |
| WO | WO 2009/061539 | 5/2009 |
| WO | WO 2009/105651 | 8/2009 |
| WO | WO 2010/082970 | 7/2010 |
| WO | WO 2010/099218 | 9/2010 |
| WO | WO 2011/140481 | 11/2011 |
| WO | WO 2011/142841 | 11/2011 |
| WO | WO 2012/003026 | 1/2012 |
| WO | WO 2014/169222 | 10/2014 |
| WO | WO 2015/073094 | 5/2015 |
| WO | WO 2015/160798 | 10/2015 |
| WO | WO 2015/160822 | 10/2015 |
| WO | WO 2016/081048 | 5/2016 |

OTHER PUBLICATIONS

Attwood et al, "The compressive response of ultra-high molecular weight polyethylene fibres and composites", International Journal of Solids and Structures, 2015, pp. 141-155, vol. 71, Published by Elsevier, Amsterdam.

Attwood et al, "The out-of-plane compressive response of Dyneema composites", Journal of the Mechanics and Physics of Solids, 2014, pp. 200-226, vol. 70, Published by Elsevier, Amsterdam.

Cunniff, "Dimensionless Parameters for Optimization of Textile-Based Body Armor Systems", Proc. 18th Int. Symp. of Ballistics, 1999, pp. 1303-1310 (8 pages), Published by Technomic Publishing Company, San Antonio, TX.

Dong et al, "Mechanical response of Ti-6A1-4V octet-truss lattice structures", International Journal of Solids and Structures, 2015, pp. 107-124, vol. 60-61, Published by Elsevier, Amsterdam.

Holland et al, "Effect of design on the performance of steel-alumina bilayers and trilayers subject to ballistic impact", Mechanics and Materials, 2015, pp. 241-251, vol. 91, Published by Elsevier, Amsterdam.

Holloman et al, "Impulse transfer during sand impact with a cellular structure", International Journal of Impact Engineering, 2015, pp. 36-58, vol. 82, Published by Elsevier, Amsterdam.

(56) References Cited

OTHER PUBLICATIONS

Holloman et al, "Impulse transfer during sand impact with a solid block", International Journal of Impact Engineering, 2015, pp. 98-117, vol. 76, Published by Elsevier, Amsterdam.

Karthikeyan et al, "The effect of shear strength on the impact response of laminated composite plates", European Journal of Mechanics A/Solids, 2013, pp. 35-53, vol. 42, Published by Elsevier, Amsterdam.

Karthikeyan et al, "The soft impact response of composite laminate beams", International Journal of Impact Engineering, 2013, pp. 24-36, vol. 60, Published by Elsevier, Amsterdam.

Malcom et al, "Three dimensionally woven glass fiber composite struts: characterization and mechanical response in tensions and compression", Journal of Composite Materials, 2015, pp. 25-43, vol. 50, No. 1, Published by Sage Publications, United States.

O'Masta et al, "Ballistic impact response of an UHMWPE fiber reinforced laminate encasing an aluminum-alumina hybrid panel", International Journal of Impact Engineering, 2015, pp. 131-144, vol. 86, Published by Elsevier, Amsterdam.

O'Masta et al, "Defect controlled transverse compressive strength of polyethylene fiber laminates", International Journal of Solids and Structures, 2015, pp. 130-149, vol. 52, Published by Elsevier, Amsterdam.

O'Masta et al, "Indentation of polyethylene laminates by a flat-bottomed cylindrical punch", Composites: Part A, 2016, pp. 138-147, vol. 80, Published by Elsevier, Amsterdam.

O'Masta et al, "Mechanisms of penetration in polyethylene reinforced cross-ply laminates", International Journal of Impact Engineering, 2015, pp. 249-264, vol. 86, Published by Elsevier, Amsterdam.

O'Masta et al, "Mechanisms of projectile penetration in dyneema encapsulated aluminum structures", International Journal of Impact Engineering, 2014, pp. 16-35, vol. 74, Published by Elsevier, Amsterdam.

Phoenix et al, "A new membrane model for the ballistic impact response and V50 performance of multi-ply fibrous systems", International Journal of Solids and Structures, 2003, pp. 6723-6765, vol. 40, Published by Elsevier, Amsterdam.

Schneider et al, "Dynamic compression response of self-reinforced poly(ethylene terephthalate) composites and corrugated sandwich cores", Composites: Part A, 2015, pp. 96-105, vol. 77, Published by Elsevier, Amsterdam.

St-Pierre, "The low velocity impact response of sandwich beams with a corrugated core or a Y-frame core", International Journal of Mechanical Sciences, 2015, pp. 71-80, vol. 91, Published by Elsevier, Amsterdam.

Uth et al, "The Effect of inclination and stand-off on the dynamic response of beams impacted by slugs of a granular material", International Journal of Solids and Structures, 2015, pp. 154-174, vol. 56-57, Published by Elsevier, Amsterdam.

Wadley et al, "Effect of core topology on projectile penetration in hybrid aluminum/alumina sandwich structures", International Journal of Impact Engineering, 2013, pp. 99-113, vol. 62, Published by Elsevier, Amsterdam.

* cited by examiner

LIGHTWEIGHT BALLISTIC RESISTANT ANTI-INTRUSION SYSTEMS AND RELATED METHODS THEREOF

CROSS-REFERENCE TO RELATED APPLICATIONS

The present application claims benefit of priority under 35 U.S.C. § 119(e) from U.S. Provisional Application Ser. No. 62/256,504, filed Nov. 17, 2015, entitled "Lightweight Ballistic Resistant Anti-intrusion Systems and Related Methods Thereof;" the disclosure of which is hereby incorporated by reference herein in its entirety.

FIELD OF THE INVENTION

The present invention relates generally to the field of blast mitigation. More specifically, the invention relates to the subfields of cellular materials implemented as blast mitigation systems for building architecture, equipment, appliance, electronics or system housing, vehicles, crafts or other transportation structures, as well as non-transportation structures.

BACKGROUND

The FAA Advisory Circular (Ac No. 25.795-2A) specifies that protection of a passenger aircraft flight deck requires the flight deck door to be able to resist forcible intrusion by a 300 J (221.3 ft-pounds) localized loading event, and sustain a 1113 N (250 lb) tensile load applied to accessible hand holds (e.g. a door knob or handle). It also requires a capability to resist multiple hits from small arms fire. The Advisory indicates that a flight deck door must also be able to resist small arms fire. In particular, it specifies that the door must:

Resist penetration by a 9 mm full metal jacketed round nose bullet with mass of 8 g and reference velocity of 436 m/s (FMJ RN round).

Resist penetration by a .44 Magnum (JHP) jacketed hollow point bullet with a nominal mass of 15.6 g and impact velocity of 436 m/s.

Survive four impacts at zero obliquity and 2 impacts at a 30° obliquity by each projectile (12 impacts).

Have an aerial density of substantially less than 1 lb/ft$^2$ (4.9 kg/m$^2$).

OVERVIEW

Aramid fiber fabrics have sometimes been embedded in compliant polymer matrices provided the lowest aerial density solution. However, in recent years significant advances have occurred in the development of polyethylene fibers and tapes which when arranged in [0°/90°] lay-ups, offer significant improvements in ballistic resistance that facilitate substantial reductions in aerial density without loss of ballistic resistance.

Many mechanisms are utilized to arrest the penetration of projectiles incident upon a target, including deformation and fragmentation of the projectile on a hard target strike face, projectile deceleration with controlled momentum transfer to the target, and spall shield capture of partially defeated projectile/target debris at the rear of a target [See 1]. Different materials are used to exploit each mechanism; hard (and ideally tough) materials are utilized to deform and fragment projectiles, high strength but fracture resistant materials for deceleration (by plastic dissipation) and ultra-high strength fibers in the form of textiles or composites in the form of spall shields to catch debris. In a well-designed protection concept, synergies are sought between the three material components to enhance performance for a spectrum of threats [See 2]. However, the lightest protection against (soft) lead core projectiles is achieved using fiber based composite materials.

To maximize their ballistic performance, the present inventors submit that the fibers must have a balanced combination of properties including:

(i) A high tensile strength to resist the significant stretching forces that arise during edge restrained fiber deflection.

(ii) A high fiber strain-to-failure to convert projectile kinetic energy to stored strain (potential) energy in the laminate.

(iii) A high elastic modulus to reduce the amplitude of dynamic out-of-plane (transverse) displacements.

(iv) A low density for aircraft applications.

(v) A high inplane elastic wave speed to maximize the volume of material that participates in projectile defeat.

Many fibers have been (or are being) developed for ballistic applications. FIG. 1 plots their quasi-static tensile strength and Young's modulus. The chart indicates that PIPD (M5) fibers have the highest strength while ceramic fibers based upon high modulus carbon, SiC and B$_4$C used for structural composites have the highest modulus. Zylon (PBO) has a promising combination of both parameters followed by recently developed grades of ultrahigh molecular weight polyethylene (UHMWPE) made by DSM with the trade name Dyneema®. However, the M5 fiber has proven difficult to commercialize and Zylon was found to degrade upon exposure to moisture and UV radiation (it has been withdrawn from the market). The present inventors note that the material property chart does not address the role of fiber density, which is critical in an aerospace application, nor the influence of the failure strain, which governs the mechanical work that can be stored per unit mass. It also does not address the low shear modulus and strength of the polymer fibers which makes them unsuited for most structural applications.

FIG. 1 is a screenshot showing a material property chart comparing the tensile strength and Young's modulus of high performance fibers.

An aspect of an embodiment of the present invention provides, among other things, a method for manufacturing a ballistic resistance package. The method may comprise: providing a molecularly oriented fibrous tape material having a front face and back face with a minimum of two sets of parallel side faces, wherein the molecularly oriented fibrous tape material comprises ultrahigh molecular weight polyethylene (UHMWPE) or aramid molecules; wrapping molecularly oriented fabric material around the front and back faces and a set of the parallel side faces of the molecularly oriented fibrous tape material, yielding a wrapped core structure, wherein the molecularly oriented fabric material comprises ultrahigh molecular weight polyethylene (UHMWPE) or aramid molecules; and finalizing the wrapped core structure to yield the ballistic resistance package.

An aspect of an embodiment of the present invention provides, among other things, a ballistic resistance package. The ballistic resistance package may comprise: a molecularly oriented tape material having a front face and back face with a minimum of two sets of parallel side faces, and wherein the molecularly oriented tape material comprises ultrahigh molecular weight polyethylene (UHMWPE) or aramid molecules; and a molecularly oriented fabric material wrapped around the front and back faces and a set of the parallel side faces of the molecularly oriented tape material, yielding a ballistic resistance package after it has been finalized, and wherein the molecularly oriented fabric material comprises ultrahigh molecular weight polyethylene (UHMWPE) or aramid molecules.

An aspect of an embodiment of the present invention provides, among other things, a multifunction ballistic resistance system for resisting projectiles and/or mitigating blast effects of explosions. The multifunction ballistic resistance system may comprise: at least one cellular frame defining cells therein, the cellular frame with a top and a bottom, and a plurality of molecularly oriented tape material core structures wrapped in molecularly oriented fabric material and finalized, and attached to at least one cellular frame. Further, wherein the molecularly oriented tape material comprises ultrahigh molecular weight polyethylene (UHMWPE) or aramid molecules, and the molecularly oriented fabric material comprises ultrahigh molecular weight polyethylene (UHMWPE) or aramid molecules.

A method for manufacturing a ballistic resistance package which includes providing a molecularly oriented tape material having a front face and back face with a minimum of two sets of parallel side faces; wrapping molecularly oriented fabric material around the front and back faces and a set of the parallel side faces of the molecularly oriented tape material, yielding a wrapped core structure; and finalizing the wrapped core structure to yield the ballistic resistance package. A multifunction ballistic resistance system for resisting projectiles and/or mitigating blast effects of explosions. The multifunction ballistic resistance system may include: at least one cellular frame defining cells therein, and a plurality of molecularly oriented tape material core structures wrapped in molecularly oriented fabric material and finalized, and attached to at least one cellular frame.

It should be appreciated that various sizes, dimensions, contours, rigidity, shapes, flexibility and materials of any of the components or portions of components in the various embodiments discussed throughout may be varied and utilized as desired or required.

It should be appreciated that while some dimensions may or may not be provided on the aforementioned figures, the device may constitute various sizes, dimensions, contours, rigidity, shapes, flexibility and materials as it pertains to the components or portions of components of the device, and therefore may be varied and utilized as desired or required.

It should be appreciated that any of the components or modules referred to with regards to any of the present invention embodiments discussed herein, may be integrally or separately formed with one another. Further, redundant functions or structures of the components or modules may be implemented.

It should be appreciated that the device and related components discussed herein may take on all shapes along the entire continual geometric spectrum of manipulation of x, y and z planes to provide and meet the structural demands and operational requirements. Moreover, locations and alignments of the various components may vary as desired or required.

BRIEF DESCRIPTION OF THE DRAWINGS

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

DETAILED DESCRIPTION OF EXEMPLARY EMBODIMENTS

Figure 1:
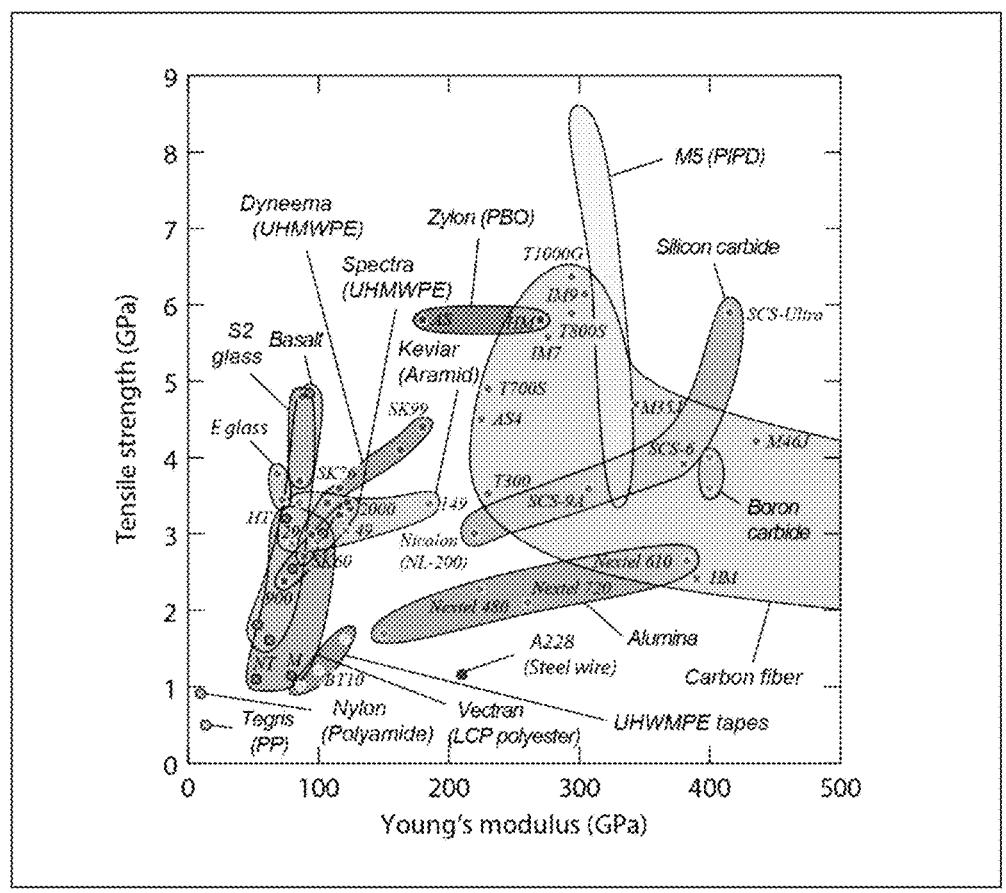
FIG. 1 is a screenshot showing a material property chart comparing the tensile strength and Young's modulus of high performance fibers.

An aspect of an embodiment of the present invention provides, among other things, systems (as well as related methods of use and manufacture) of interest that are based upon strong, very long linear molecules such as ultrahigh molecular weight polyethylene or aramid molecules. They can be organized to form fibers or to form tapes. For example, an aspect of an embodiment of the present invention provides, but not limited thereto, a system that protects a door made of just the fiber systems or just the tape systems or one that uses them both.

For example, an aspect of an embodiment of the present invention provides, an interior ballistic material that could be a ballistic fiber or tape (E.g., Dyneema makes a tape called BT-10 and other make their own as well). Tape is essentially the same molecule as the fiber but is now in the form of a tape (i.e. sheet like cross section) verses a circular (or other elliptical or even square or rectangular shape; or other polygonal shape) fiber. The external wrapping layer would be a ballistic fiber. The final selection could be based upon satisfying many aims such as lightest ballistic solution, lowest cost, least moisture absorption, reducing the risk of fire or smoke or toxicity. Material options will increase over time as new materials become available.

Method of Making a Ballistic Resistance Package

Turning to the schematic illustrations of FIGS. 11-15, a method for manufacturing a ballistic resistance package 21 is generally illustrated. The method may comprise providing a molecularly oriented tape material 31 having a front face 33 and back face 34 with a minimum of two sets of parallel side faces 37a, 37b, 38a, 38b. The molecularly oriented tape material 31 may comprise ultrahigh molecular weight polyethylene (UHMWPE) and/or aramid molecules. The method includes wrapping molecularly oriented fabric material 41 and 51 around said front and back faces 33, 34 and at least two sets of said parallel side faces 37a, 37b, 38a, 38b of said molecularly oriented tape material 31, yielding a wrapped core structure 39, wherein said molecularly oriented fabric material 41 and 51 comprises ultrahigh molecular weight polyethylene (UHMWPE) and/or aramid molecules. Moreover, the method includes finalizing the wrapped core structure 39 to yield the ballistic resistance package 21. The ballistic resistance package 21 may be a variety of shapes, contours, and sizes as desired or required. The ballistic resistance package 21 may be numerous layers, and such layers may be oriented in a variety of directions.

The method of finalizing the ballistic resistance package may comprises one or more of the following: consolidating the wrapped core structure by using a hot press 61 under pressure 62 and an autoclave 63; infiltration of a dry tape material with resin by VARTM or similar method; using an adhesive to prevent the wrap from unraveling; or sewing the end of the wrap to the outer wrapped surface. Other pressing, joining, molding, consolidating, sealing, adhesion, and heating techniques may be deployed as desired or required.

The molecularly oriented tape material 31 may further comprises a plurality of layers of tape material 35a, 35b wherein the most outer of plurality of layers define said front and back faces 33, 34 of said molecularly oriented tape material.

The molecularly oriented tape material 31 may be in a woven, ply, pre-preg or laminate form (as well as any combination of one or more thereof).

The molecularly oriented tape material 31 may comprises at least one or more of the following: alumina, boron carbide, carbon (PAN and pitch based), glass, para-aramid, PBO, PIPD, polyamide, silicon carbide, or titanium carbide fibers (as well as any combination of one or more thereof).

The ballistic resistance package (provided by the method) may further comprises a cellular frame 71, wherein said cellular frame 71 may be configured to accommodate said ballistic resistance package 21 inserted therein.

The cellular frame 71 may be a honeycomb lattice structure having cells 72 with a variety of shapes, such an elliptical, circular, rectangular, hexagonal, or any polygonal shape.

The cellular frame 71 may be utilized as part of a door 81. The door 81 may be a variety of types and utilized various attachment techniques as desired or required. Also shown is a bolt 82, knob 83, and hinges 84.

The cellular frame 71 may be a variety of shapes, contours, and sizes, and may be a part of a static load bearing member of any one of: an architectural structure, a civil engineering structure, a military security/protection/defense structure, a machine structure, an automobile structure, a ship structure, a freight car structure, an aircraft structure, a spacecraft structure, a space station structure, and a submarine, structure. The cellular frames 71 may be stacked in numerous layers, and such layers may be oriented in a variety of directions. Moreover, the cellular frames 71 may utilized as face panels (as illustrated), as well as side panels or both.

The molecularly oriented fabric material 41 may be in a woven, ply, pre-preg or laminate form (as well as any combination of one or more thereof).

The molecularly oriented fabric material 41, 51 may comprises at least one or more of the following: alumina, boron carbide, carbon (PAN and pitch based), glass, para-aramid, PBO, PIPD, polyamide, silicon carbide, or titanium carbide fibers (as well as any combination of one or more thereof).

The wrapping of the molecularly oriented tape material 31 may comprises at least two separate units 42, 52 of molecularly oriented fabric material 41, 51 wrapped in unique directions 43, 53.

The at least two separate units 42, 52 of molecularly oriented fabric material 41, 51 may be wrapped in unique directions 43, 53 so as to alternate wrapping the molecularly oriented tape material 31 sequentially.

The wrapping of the molecularly oriented tape material 31 in said molecularly oriented fabric material 41 may comprises creation of multiple layers of wrapped molecularly oriented fabric material covering the molecularly oriented tape material panel, so as to provide the wrapped core structure 39.

In an embodiment, the number of units, strips or rolls of fabric material wrapped around each core structure can vary. In most embodiments, the number of rolls used equals the number of sets of parallel sides. For example, a square has two sets of parallel sides, and thus uses two rolls. A hexagon would use three rolls, an octagon four rolls, and so on. Generally these separate rolls will be applied such that fabric material covers the entire core structure, though on occasion there may be incentive to expose a piece of the core or have certain sections of the core less wrapped than other sections.

In an embodiment, each roll should at a minimum be long enough for one complete wrap around the core structure. Ideally each roll will be of sufficient length to form the desired number of layers in one particular wrapping direction. In one embodiment, the rolls will be applied sequentially, each roll forming a layer until all the rolls have formed layers, and repeating this sequential process until wrapping completes. In another embodiment, one roll wraps around the tile until complete, followed by a second roll, and so on until all rolls have been used. However, multiple strip lengths may be used in one wrapping direction if limited by design constraints.

Ballistic Resistance Package

Still referring to the schematic illustrations of FIGS. 11-15, a ballistic resistance package 21 may comprise a molecularly oriented tape material 31 having a front face 33 and back face 34 with a minimum of two sets of parallel side faces 37a, 37b, 38a, 38b, and wherein said molecularly oriented tape material 31 may comprise ultrahigh molecular weight polyethylene (UHMWPE) and/or aramid molecules. The ballistic resistance package 21 may comprise a molecularly oriented fabric material 41 wrapped around said front and back faces 33, 34 and a set of said parallel side faces 37a, 37b, 38a, 38b of said molecularly oriented tape material 31, yielding a ballistic resistance package after it has been finalized (referenced as 21, for example), and wherein said molecularly oriented fabric material 41 comprises ultrahigh molecular weight polyethylene (UHMWPE) or aramid molecules. The ballistic resistance package 21 may be a variety of shapes, contours, and sizes as desired or required. The ballistic resistance package 21 may be numerous layers, and such layers may be oriented in a variety of directions.

The finalizing may comprise one or more of the following: a consolidation of the wrapped core structure by using a hot press and an autoclave; an infiltration of a dry tape material with resin by VARTM or similar method; an application of an adhesive to prevent the wrap from unraveling; or sewing the end of the wrap to the outer wrapped surface. Other pressing, joining, molding, consolidating, sealing, adhesion, and heating techniques may be deployed as desired or required The wrapping of the molecularly oriented tape material 31 results in multiple layers of molecularly oriented fabric material 35a, 35b.

The wrapping of said molecularly oriented tape material 31 may comprises of at least two separate units 42, 52 of molecularly oriented fabric material 41, 51 wrapped in unique directions 43, 53 around different sets of parallel side faces 37a, 37b, 38a, 38b.

The ballistic molecularly oriented tape material 31 may further comprises a plurality of layers of tape material 35a, 35b wherein the most outer of plurality of layers define said front and back faces 33, 34 of said high-performance molecularly oriented tape material 31.

The molecularly oriented tape material 31 may be in a woven, ply, pre-preg or laminate form (as well as any combination of one or more thereof).

The molecularly oriented tape material 31 may comprise at least one or more of the following: alumina, boron carbide, carbon (PAN and pitch based), glass, para-aramid, PBO, PIPD, polyamide, silicon carbide, or titanium carbide fibers (as well as any combination of one or more thereof).

The molecularly oriented fabric material 41 may be in a woven, ply, pre-preg or laminate form (as well as any combination of one or more thereof).

The molecularly oriented fabric material 41 may comprise at least one or more of the following: alumina, boron carbide, carbon (PAN and pitch based), glass, para-aramid, PBO, PIPD, polyamide, silicon carbide, or titanium carbide fibers (as well as any combination of one or more thereof).

The ballistic resistance package 21 may further comprises a cellular frame 71, wherein said cellular frame 71 may be configured to accommodate said ballistic resistance packages 21 inserted therein or attached thereto (or in communication therewith).

The cellular frame 71 may be a honeycomb lattice structure having cells 72 with a variety of shapes, such an elliptical, circular, rectangular, hexagonal, or any polygonal shape.

The cellular frame 71 may be utilized as part of a door 81. The door 81 may be a variety of types and attachment techniques as desired or required. Also shown is a bolt 82, knob 83, and hinges 84.

The ballistic resistance package(s) may comprise (or in communication with) a cellular frame 71 whereby the cellular frame may be a variety of shapes, contours, and sizes, and may be part of a static load bearing member of any one of: an architectural structure, a civil engineering structure, a military security/protection/defense structure, a machine structure, an automobile structure, a ship structure, a freight car structure, an aircraft structure, a spacecraft structure, a space station structure, and a submarine, structure. The cellular frames 71 may be stacked in numerous layers, and such layers may be oriented in a variety of directions. Moreover, the cellular frames 71 may utilized as face panels (as illustrated), as well as side panels or both.

System for Ballistic Resistance Package Based on Cellular Frame or Lattice

Still referring to the schematic illustrations of FIGS. 11-15, provided is a multifunction ballistic resistance system 91 for resisting projectiles and/or mitigating blast effects of explosions. The multifunction ballistic resistance system 91 may comprise at least one cellular frame 71 defining cells 72 therein, said cellular frame 71 with a top 74 and a bottom 75. The multifunction ballistic resistance system 91 may further comprise a plurality of molecularly oriented tape material core structures 31 wrapped in molecularly oriented fabric material 41, 51 (wrapped as shown as 39) and finalized (shown as 21), and attached to at least one cellular frame 71 as desired or required. Additionally, said molecularly oriented tape material 31 may comprise ultrahigh molecular weight polyethylene (UHMWPE) and/or aramid molecules, and said molecularly oriented fabric material 41, 51 may comprises ultrahigh molecular weight polyethylene (UHMWPE) or aramid molecules.

The finalizing may comprise one or more of the following: a consolidation of the wrapped core structure by using a hot press 61 and an autoclave 63; an infiltration of a dry tape material with resin by VARTM or similar method; an application of an adhesive to prevent the wrap from unraveling; or sewing the end of the wrap to the outer wrapped surface. Other pressing, joining, molding, consolidating, sealing, adhesion, and heating techniques may be deployed as desired or required.

The cellular frame 71 may be a honeycomb structure having cells 72 with a variety of shapes, such an elliptical, circular, rectangular, hexagonal, or any polygonal shape.

The at least one cellular frame is utilized as a door 81. The door 81 may be a variety of types and attachment techniques as desired or required. Also shown is a bolt 82, knob 83, and hinges 84.

The plurality of wrapped molecularly oriented tape material core structures 21 may be disposed in respective cells 72 of said at least one cellular frame 71.

The multifunction ballistic resistance system 91 may further comprise: at least one top plate 94 disposed to the top 74 of at least one said cellular frame 71 and/or at least one bottom plate 95 disposed to the bottom 75 of at least one of said cellular frame 71.

The system may include multiple cellular frames 71 that are aligned in a stacked fashion respective to one another.

The molecularly oriented tape material 31 may be in a woven, ply, pre-preg or laminate form (as well as any combination of one or more thereof).

The molecularly oriented tape material 31 may further comprises at least one or more of the following: alumina, boron carbide, carbon (PAN and pitch based), glass, para-aramid, PBO, PIPD, polyamide, silicon carbide, or titanium carbide fibers (as well as any combination of one or more thereof).

The molecularly oriented fabric material 41 may be in a woven, ply, pre-preg or laminate form (as well as any combination of one or more thereof).

The molecularly oriented fabric material 41 may comprise at least one or more of the following: alumina, boron carbide, carbon (PAN and pitch based), glass, para-aramid, PBO, PIPD, polyamide, silicon carbide, or titanium carbide fibers (as well as any combination of one or more thereof).

The molecularly oriented tape material is wrapped by at least two rolls of material, sequentially alternating layers of molecularly oriented fabric material from the at least two rolls of molecularly oriented fabric material. Further, wherein each of the at least two rolls of molecularly oriented fabric material wraps around the molecularly oriented tape material at least twice.

The multifunction ballistic resistance system 91 may be a variety of shapes, contours, and sizes, and may be part of a static load bearing member of any one of: an architectural structure, a civil engineering structure, a military security/protection/defense structure, a machine structure, an automobile structure, a ship structure, a freight car structure, an aircraft structure, a spacecraft structure, a space station structure, and a submarine, structure. The cellular frames 71 may be stacked in numerous layers, and such layers may be oriented in a variety of directions. Moreover, the cellular frames 71 may utilized as face panels (as illustrated), as well as side panels or both.

EXAMPLES

Practice of an aspect of an embodiment (or embodiments) of the invention will be still more fully understood from the following examples and experimental results, which are presented herein for illustration only and should not be construed as limiting the invention in any way.

Example and Experimental Results Set No. 1

In an embodiment, exemplary fibrous materials include any high performance fiber based material that is in woven, ply, pre-preg or laminate form. That is the fibrous material may be solely constituted by fibers or fibers/fabrics embedded with a polymeric matrix/resin/adhesive. High-performance fibers have a strength-to-weight ratio several times higher than steel allowing them to absorb a substantial amount of energy when pulled in tension.

Common materials used for fibers include alumina, para-aramid, boron carbide, carbon (PAN and pitch based), glass, PBO, PIPD, silicon carbide, titanium carbide and UHM-WPE. Some of these fiber based products are found under the commercial names Nextel®, Kevlar®, Twaron®, Dyneema®, Spectra®, Zylon®, M5®, Nylon® and IM- or T-series carbon fibers, which all have high-tensile strength to weight ratios several times greater than steel.

In an embodiment, the high-performance fibrous material tape component forms the core structure, and which is then wrapped in a high-performance fibrous material fabric. Common fibrous materials include Kevlar®, Twaron®, Dyneema®, Spectra®, Zylon®, M5®, Nylon® E-, S- or S2-glass fibers, and IM- or T-series carbon fibers. In a preferred embodiment, the wrapping will be several layers thick, and layers alternate in different directions between multiple rolls or units of fabric. In other words, a first roll can wrap around the base tape panel in a first direction creating a first layer, and a second roll can wrap around the base tape panel in a second direction, creating a second layer. There can be additional rolls or units of fabric, applied in the same or alternative directions, in various embodiments.

After completion of wrapping, the fibrous material may need further treatment before being used as anti-projectile armor. Fibrous materials that use a matrix/resin/adhesive may need to be consolidated or cured. The need for curing and consolidation is dependent upon the fiber-matrix system and the application. The matrix should provide sufficient interlaminar adhesion without compromising the ease of handling of the anti-projectile package. Consolidation can be performed using hot presses to remove any additional air in the fabric layering and seal the layers together. Consolidation can also be performed using autoclaves, which can cure any adhesives/resins used, such as those used for adhering ceramics to metal tile frames or for adhering fabric layers to one another. Non-resin based systems may be finalized by stitching or gluing the free end of the roll to the outer wrap surface. This finalization step to the anti-projectile package should produce a smooth, compact, finished product which can be used without likelihood of unraveling.

Example and Experimental Results Set No. 2

Recent studies by the present inventors of the impact of thick, edge clamped UHMWPE laminates has revealed the existence of two stages of projectile penetration [See 3]. Penetration is initially progressive, with the depth of penetration increasing linearly with impact velocity [See 4]. Little evidence of macroscopic out of plane plate deflection accompanies this stage, and the mechanism of penetration is similar to that for a rear supported plate (with fully suppressed out of plane deflection). As progressive penetration progresses, the projectile is slowed by the work it performs on the target [See 5]. A second mechanism of response is then activated. This involves membrane stretching with significant out-of-plane deflection, and a binary survival probability. This stage absorbs many times more impact energy per unit penetration distance than the initial, progressive penetration stage, [See 6] but can only be activated once the projectile contact pressure falls below a critical value.

The membrane stretching deformation mechanism was analysed by Phoenix and Porwal [See 7]. In their model, they addressed both the fast moving extensional wave (with a propagation speed, $c_L=\sqrt{E/\rho}$ where E is the inplane Young's modulus of the laminate in a fiber direction and $\rho$ is its density) followed by a slower plastic hinge moving at a velocity $c_H$ (FIG. 2; i.e., Thin Laminate (a)), which bounds the transversely deflected region of the Dyneema® plate. Their analysis assumed membrane stretching of the Dyneema® was engulfed by the extensional wave to cause tensile fiber failure under the projectile above a critical pressure.

Figure 2:
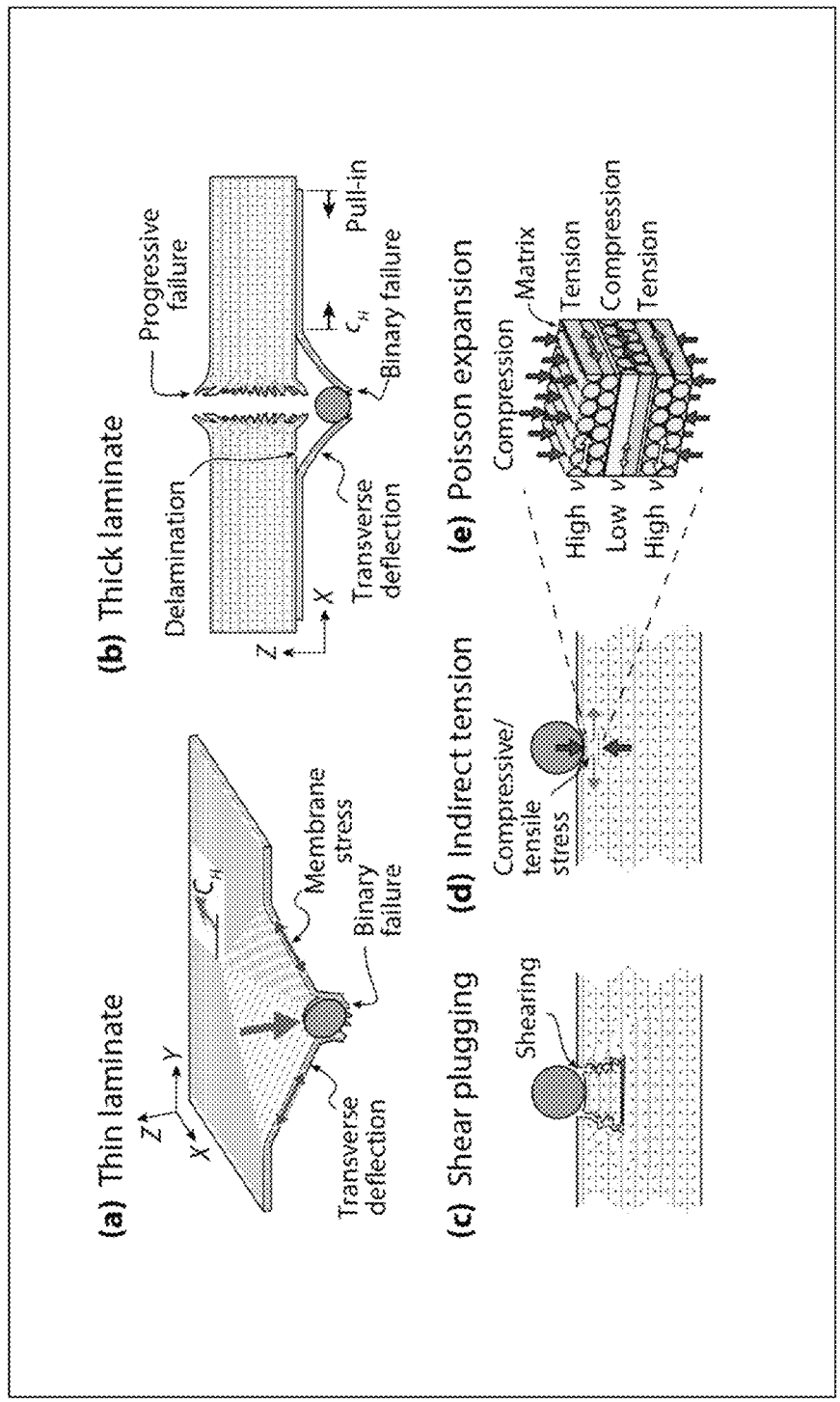
FIG. 2 is a screenshot showing mechanisms of penetration of [0°/90°] oriented Dyneema composite laminates.

FIG. 2 is a screenshot showing mechanisms of penetration of [0°/90°] oriented Dyneema composite laminates. Phoenix and Porwal demonstrated that the ballistic limit of composite plates failing by mechanism (see portion "a" of screenshot) in FIG. 2 scales with a merit index c*, for ballistic resistance earlier proposed by Cunniff on the basis of dimensional analysis [See 8]. Cunniff argued that the ballistic limit of a fiber composite target of fixed mass per unit area (and projectile) scaled linearly with the Cunniff velocity c* of the fiber defined by:

$$c^* = \left(\frac{\sigma_f \varepsilon_f}{2\rho} \sqrt{\frac{E}{\rho}}\right)^{1/3} \quad (1)$$

where $\sigma_f$ and $\varepsilon_f$ are the tensile failure strength and failure strain of the fibers respectively, E is the tensile modulus of the fibers and $\rho$ their density. The two material properties that make up the definition of c* are the specific energy absorption $\sigma_f \varepsilon_f/(2\rho)$ and extensional (or longitudinal) wave speed $c_L=\sqrt{E/\rho}$ of the fibers. A map, FIG. 3, has been compiled for the specific energy absorption and longitudinal wave speed for the materials shown in FIG. 1, and contours of the Cunniff velocity c* have been added. The three highest c* ballistic limit materials are all polymers; UHWMPE Dyneema®, PBO (Zylon) and PIPD (the M5 fiber). Since neither the M5 fiber nor Zylon are viable candidates, the best solution was (until very recently) the Dyneema® SK76 UHMWPE fiber based composite system (which has been combined with 17 wt. % polyurethane resin to form [0°/90°]$_2$ cross-ply HB26 grade laminate). The laminates are highly anisotropic, having inplane tensile strengths of a few GPa but a shear strength of only a few MPa [See 9]. Examination of FIG. 3 shows that the SK76 fiber system has more than a 100 m/s higher value of c* than the aramid fibers such as Kevlar KM2 and about a 50 m/s higher c* than Honeywell's Spectra grades of polyethylene fiber.

The ballistic limit of a 6 mm (96 ply) thick (5.89 kg m$^{-2}$), Dyneema® HB26 plates impacted by a nondeforming, 12.7 mm diameter steel spherical projectile is about 445 ms$^{-1}$. However, examination of the laminates after impact reveals that penetration of the laminate is progressive, with the number of failed plies increasing with impact velocity. No shear plug formation mechanism, FIG. 2 (Shear plugging (see portion "c" of screenshot)) was observed, and the observation of progressive failure was inconsistent with the Phoenix and Porwall model of binary failure in a membrane-stretching mode (a non-progressive mode of failure), FIG. 2 (Thin laminate (see portion "a" of screenshot)). Instead, progressive penetration was eventually shown to occur by an indirect tension mechanism, FIG. 2 (Indirect tension (see portion "d" of screenshot)). Penetration of the projectile is then resisted by the indirect tension failure stress, and the work done in overcoming this decelerated the projectile and decreased the contact pressure.

Figure 3:
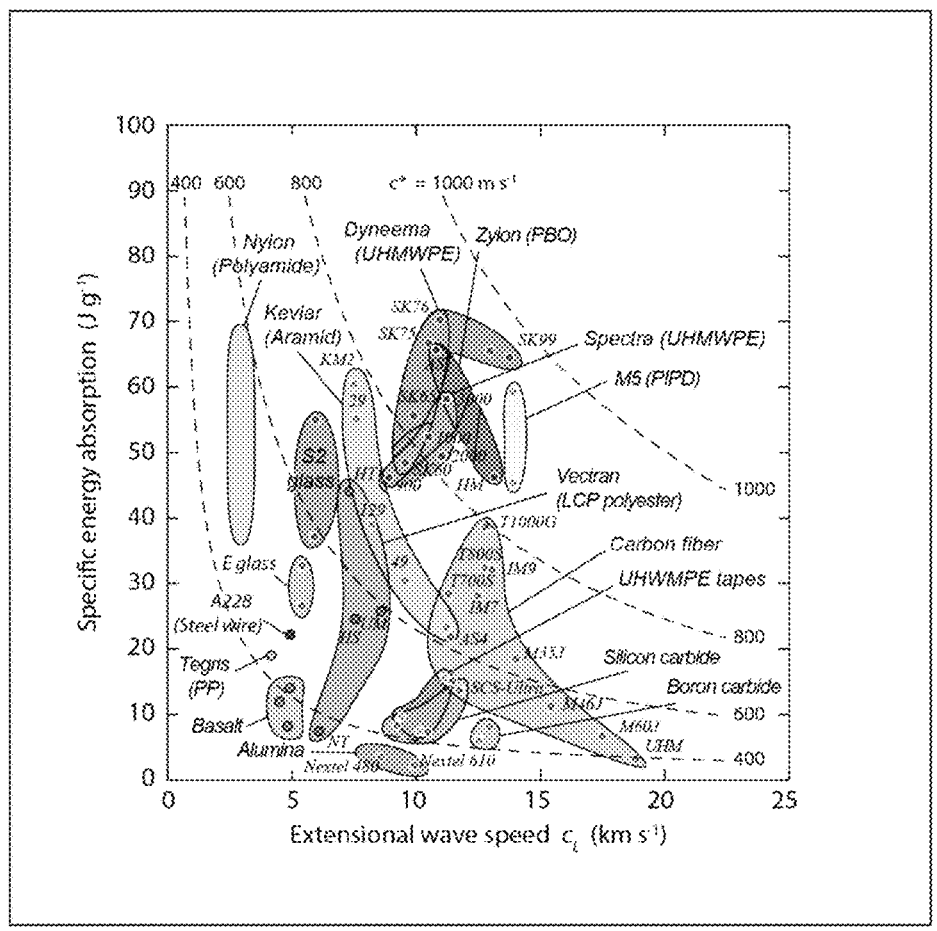
FIG. 3 is a screenshot showing Material property chart comparing the specific toughness and extensional wave speed, $c_L = (E/\rho)^{1/2}$, of high performance fibers. Contours of the Cunniff velocity, c*, are also plotted.

FIG. 3 is a screenshot showing Material property chart comparing the specific toughness and extensional wave speed, $c_L=(E/\rho)^{1/2}$, of high performance fibers. Contours of the Cunniff velocity, c*, are also plotted.

Figure 4:
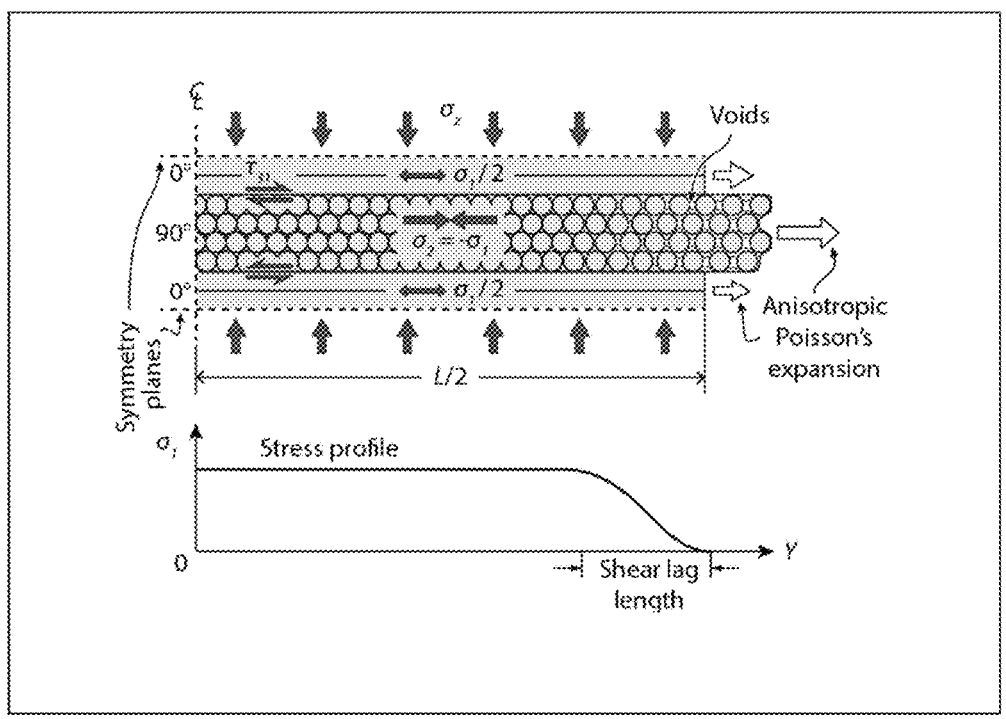
FIG. 4 is a screenshot showing a schematic illustration of a [0°/90°] cross-ply laminate loaded under uniform compression. A shear lag mechanism at the sample edge is activated by the large anisotropic plastic Poisson expansion, and converts the through thickness compressive stress into in-plane tension of the reinforcement.

In the indirect tension process, the contact pressure exerted by the projectile on the laminate causes a plastic Poisson expansion normal to the direction of the fibers but almost no expansion in the (much stiffer) fiber direction, FIG. 4. Since the ply's are aligned in a [0°/90°] orientation, the large Poisson strain of one ply loads the ply's above and below in tension (in their fiber direction) by shear lag. Eventually the ply tensile strength is reached, one or more of the plies fails, and the projectile advances through the fractured plies having done work. This work reduces the projectile velocity (and therefore pressure exerted by the projectile) until is falls below that needed to activate ply tensile failure by indirect tension. The projectile is then bought to arrest by membrane stretching of the unfailed portion of the laminate. These insights by the present inventors have led to a realization that the ballistic limit is governed by numerous properties of the polymer composite other than the fibers tensile strength, its strain to failure, elastic modulus and density. The indirect tension failure stress is highly sensitive to the magnitude and anisotropy of the Poisson's ratio, the thickness of the plies, and the shear strength of the inter-ply interfaces.

FIG. 4 is a screenshot showing a schematic illustration of a [0°/90°] cross-ply laminate loaded under uniform compression. A shear lag mechanism at the sample edge is activated by the large anisotropic plastic Poisson expansion, and converts the through thickness compressive stress into in-plane tension of the reinforcement.

Figure 5:
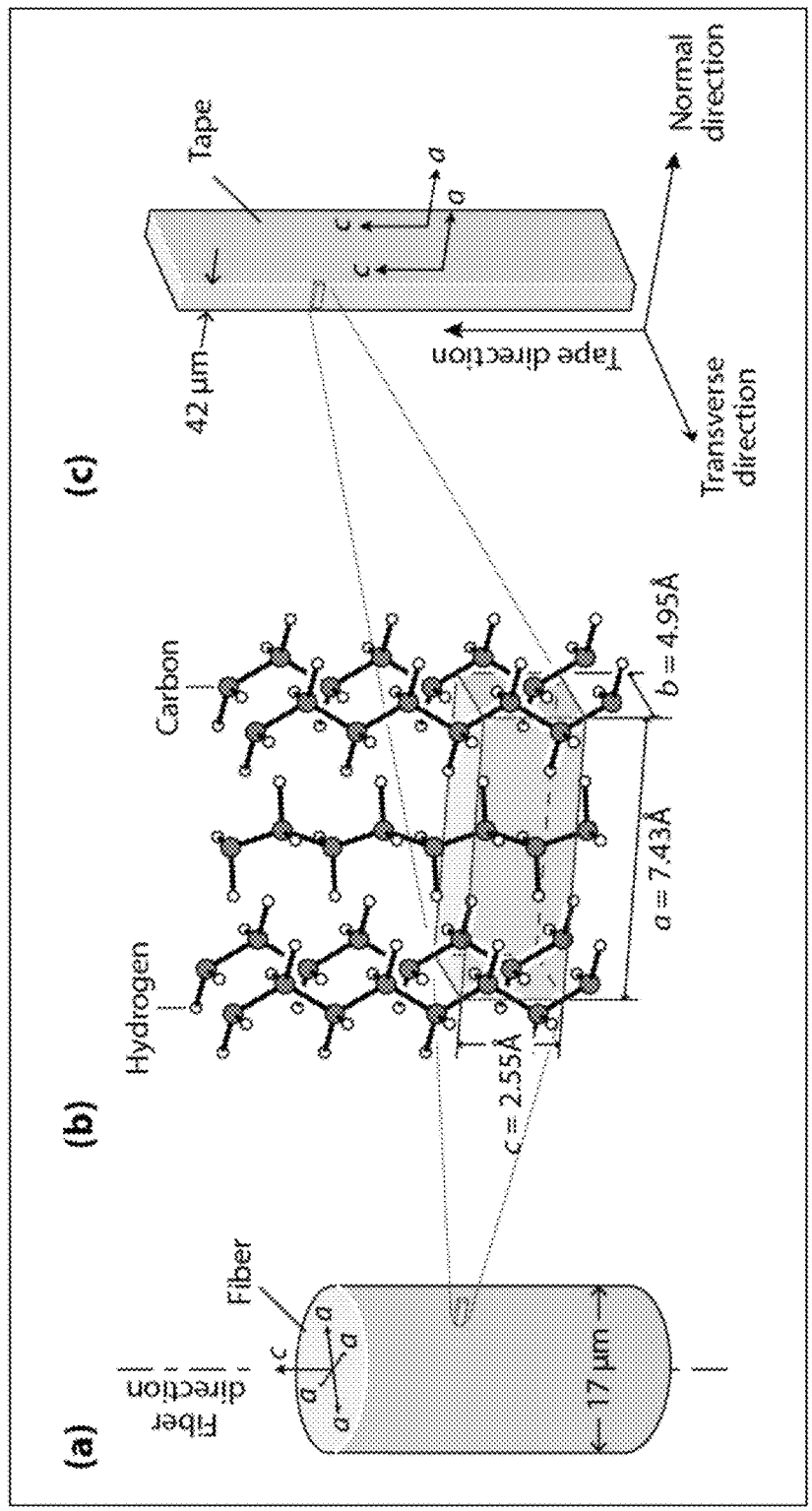
FIG. 5 is a screenshot showing the molecular architecture of UHMWPE fibers and tapes.

It also led the present inventors to a realization that UHMWPE tapes that consist of aligned molecules could provide a similar, or even superior resistance to indirect tension penetration since their Poisson's ratios are less than the fibers (even though their tensile strength is not as great as that of the best fibers). This discovery by the present inventors is significant since it is easier, and less expensive to make tape based materials compared to fibers. FIG. 5 shows the molecular structure of UHMWPE fibers and tapes. By increasing the molecular weight of the polyethylene molecules, and arranging them in a highly oriented (orthorhombic crystal) structure, it is possible to make fibers and tapes whose tensile strength and modulus begin to approach that of the polyethylene molecule (around 7 GPa and 250 GPa respectively). The present inventors have investigated a variety of prototype materials which are now beginning to become commercially available.

FIG. 5 is a screenshot showing the molecular architecture of UHMWPE fibers (see portion "a" of screenshot) and tapes (see portion "c" of screenshot).

Figure 6:
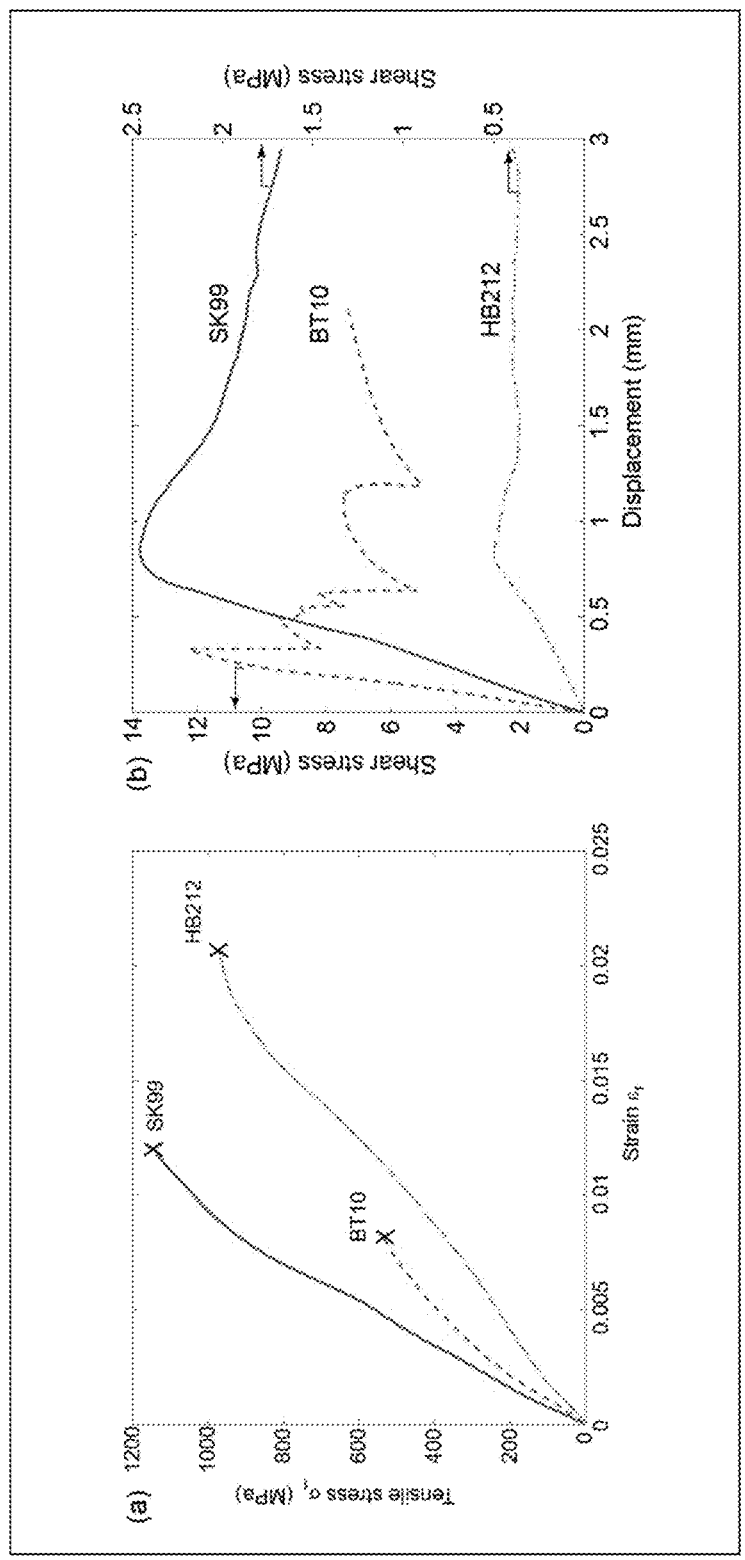
FIG. 6 is a screenshot showing the measured tensile response for all three material systems by tensile loading of dog-bone laminate samples (left portion listed as "a" in screenshot); and the measured shear response of three material systems obtained by analysis of three point bend tests (right portion listed as "b" in screenshot).

FIG. 6 shows the stress strain responses (in tension and shear) of Dyneema composites made using a new (SK 99) fiber and BT 10; a tape material which is less expensive to make than the fibers. DuPont also makes a tape material under the tradename Tensylon. Even though the tensile strength of the tape materials is substantially less than the fibers, their penetration resistance by indirect tension is similar because of their lower Poisson ratios. This is demonstrated by our out of plane compressive strength data for samples of varying widths (width the shear lag loading distance ratios), FIG. 7. It shows that the tape materials have significantly better resistances to compression (for example by the contact pressure of a projectile) than all but the highest fiber strength (but costly) fiber-based system.

FIG. 6 is a screenshot showing the measured tensile response for all three material systems by tensile loading of dog-bone laminate samples (left portion listed as "a" in screenshot); and the measured shear response of three material systems obtained by analysis of three point bend tests (right portion listed as "b" in screenshot).

Figure 7:
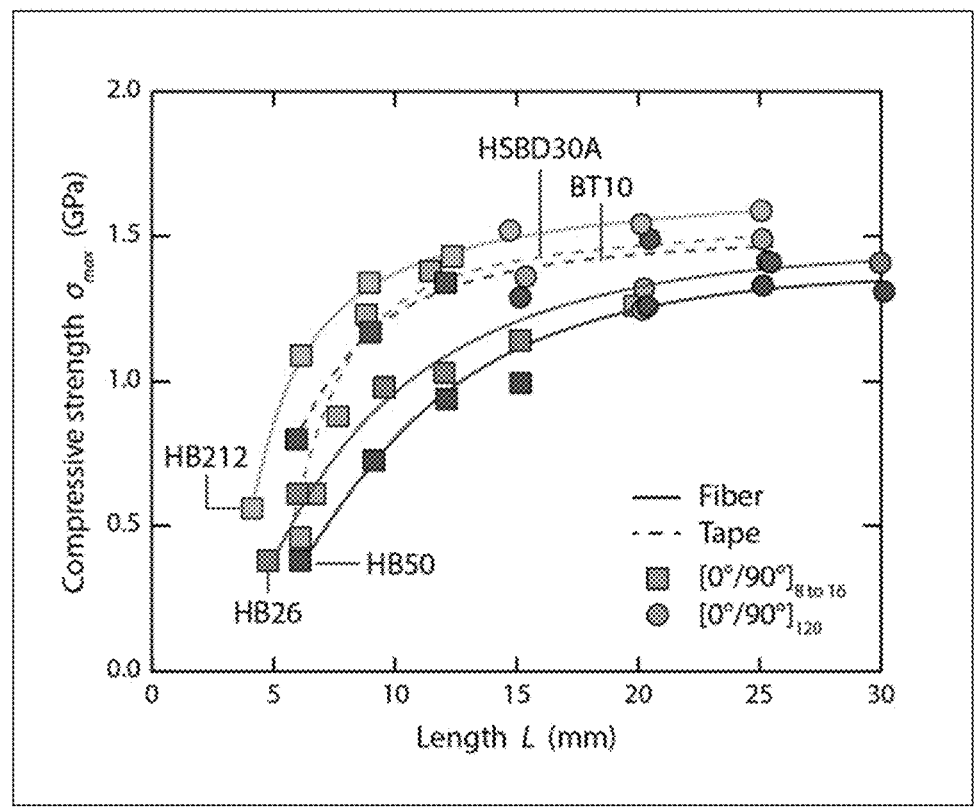
FIG. 7 is a screenshot showing the transverse compressive strength of DuPont grade HSBD30A and Dyneema BT10 tapes and three Dyneema fiber composites (HB26 and HB50 based on the SK76 fiber and HB 212 that uses the SK99 fiber).

FIG. 7 is a screenshot showing the transverse compressive strength of DuPont grade HSBD30A and Dyneema BT10 tapes and three Dyneema fiber composites (HB26 and HB50 based on the SK76 fiber and HB 212 that uses the SK99 fiber).

As a result, the least expensive solution to a ballistic impact system is a two material hybrid that uses the tape during the period of indirect tension penetration and a strong fiber system to resist membrane-stretching failure as the projectile is brought to rest.

Baseline Anti-intrusion Concept

Figure 8:
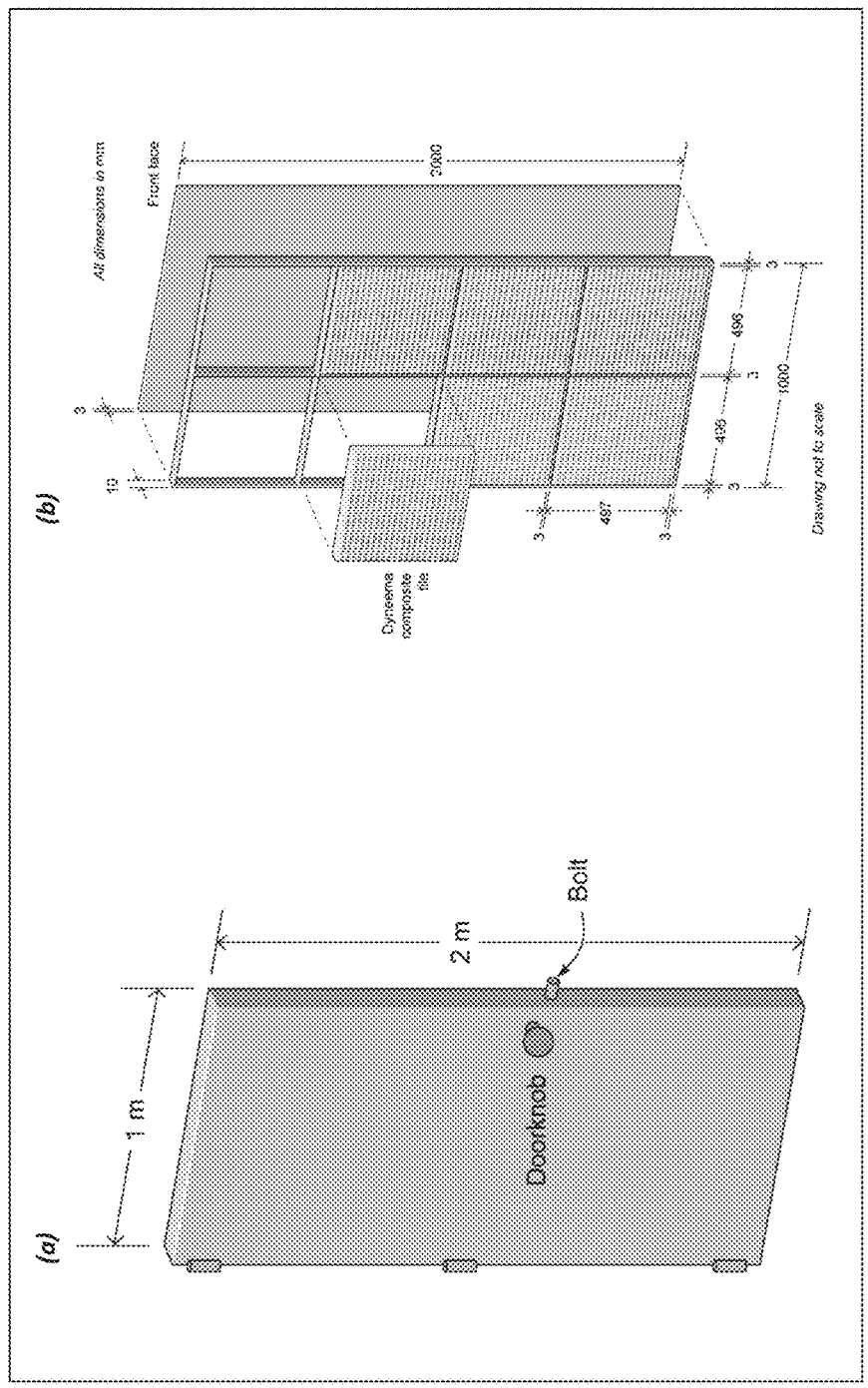
FIG. 8 is a screenshot showing: a representative flight deck door with approximate dimensions, hinge and locking locations shown (left portion listed as "a" in screenshot); and A baseline ballistic resistant door panel concept based upon hybrid Dyneema composite tiles in a square honeycomb stiffened sandwich panel door (right portion listed as "b" in screenshot).

A representative flight deck anti-intrusion door is shown in FIG. 8 (left portion listed as "a" in screenshot). To avoid forcible entry the design criteria for the bending strength of the door, and the shear resistance its hinges and locking systems must meet the FAA Advisory Circular specification above. A baseline concept that will also provide the necessary ballistic resistance is shown in FIG. 8 (right portion listed as "b" in screenshot). It consists of a multifunctional sandwich panel door to provide both bending stiffness and ballistic resistance. The initial thickness of the back and front (not shown) faces is indicated to be 3 mm, but this would be refined during the research and development effort to reduce weight. These faces are well bonded to the square honeycomb core in which is embedded Dyneema tiles. The square honeycomb provides good bending resistance while minimizing the total length of usually less ballistically effective cell edges. The ballistic resistance of this system will depend upon the grades of Dyneema and their arrangement in the tiles. One of the objectives of the present inventors' research is to provide the lightest solution to defeat the multi-hit impact threat. Preliminary studies with similar mass projectiles indicates that a tile thickness significantly less than the 6 mm (1 psf) shown in FIG. 7 is likely to be sufficient. If deflections of the back panel are to be avoided, a small gap can be maintained between the rear of the tile and the back face of the door (here the present inventors have assumed a gap of 4 mm by selecting a 10 mm deep square honeycomb).

FIG. 8 is a screenshot showing:) a representative flight deck door with approximate dimensions, hinge and locking locations shown (left portion listed as "a" in screenshot); and A baseline ballistic resistant door panel concept based upon hybrid Dyneema composite tiles in a square honeycomb stiffened sandwich panel door (right portion listed as "b" in screenshot).

A number of trades have been made to reach this baseline design. One relates to the processing route that must be used to make the Dyneema tiles whilst another addresses the gripping of the fiber component of the system which suffers substantial in-plane tensile loads at conventional gripping locations (a site of frequent failure). A typical tile manufacturing sequence developed in the laboratory of the present inventor is to address both issues is shown in FIG. 8. It involves the warm consolidation of tape and fiber pre-pregs at a temperature just below the melting point of the polyethylene crystals. The hybrid tape/fiber system is constructed by laying up tape material (BT10, Tensylon or a new DSM tape nearing commercial introduction) between sheets of the best performing SK 99 fiber based composite such as grade HB 212. It is critical that the [0°/90°] architecture be preserved throughout the stack to achieve the maximum ballistic resistance. The optimal balance between the tape and fiber materials would be experimentally determined during the research effort. By wrapping the fiber-based system around the stiffer tape core, it is possible to create high effective resistance to edge grip failures; a technique the present inventors have used successfully in the past for hypervelocity impact resistant structures. The baseline design makes no allowance for additional ballistic resistance offered by the front and rear door faces. If these are made of a light stiff material such 3D weave carbon or S-glass fiber reinforced polymer composite, the faces can provide significant ballistic resistance that would enable the Dyneema tile thickness to be reduced. Selecting door materials and optimizing the allocation of mass between the various components of the design would be a significant element of the research effort. A similar effort will be required to integrate door hinges and locking mechanisms into the door system without negatively affecting the local ballistic resistance or intrusion resistance.

Figure 9:
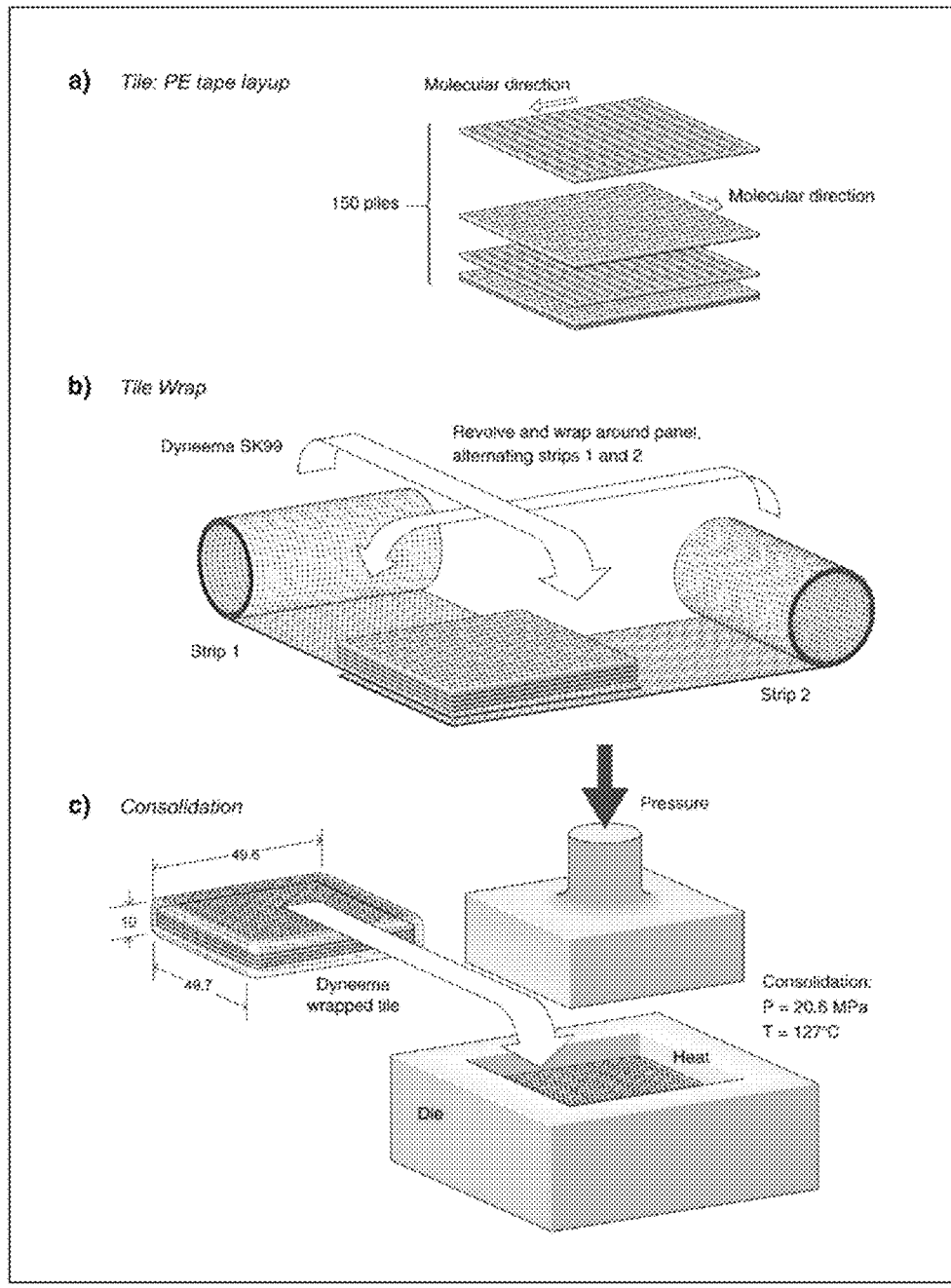
FIG. 9 is a screenshot showing the manufacture of hybrid Dyneema tiles. The process requires the lay-up of tape sheet which are then wrapped in an SK99-based composite prepreg. The package is then consolidated at 127° C. to a pressure in excess of 20.6 MPa. The lateral dimensions of the tiles are dictated by the available force that can be applied with a warm press.

FIG. 9 is a screenshot showing the manufacture of hybrid Dyneema tiles (top portion of screenshot). The process requires the lay-up of tape sheet which are then wrapped in an SK99-based composite pre-preg (middle portion of screenshot). The package is then consolidated at 127° C. to a pressure in excess of 20.6 MPa (bottom portion of screenshot). The lateral dimensions of the tiles are dictated by the available force that can be applied with a warm press.

Testing Protocols:

A significant ballistic and structural evaluation test program is envisaged. The present inventors propose a series of economical single ballistic impact tests with 9 mm and .44 Magnum projectiles at 0° and 30° obliquities be used to optimize the hybrid tile design, the ballistic properties of the door faces and the gap between the tile and rear door face. Once a final design concept has been identified, single tile subscale, multi-hit ballistic tests would be conducted to ensure that the systems can meet the ballistic requirement of the FAA Circular for both projectiles. Several full doors will be fabricated and these will be subjected to a set of qualification trials using the FAA prescribed threats. All the ballistic testing may be conducted using a protocol similar to that shown in FIG. 10. The tests will be performed at Chesapeake Testing (Aberdeen, Md.) which is a fully licensed and certified ballistic testing company that the present inventor has used for many of our previous studies.

Figure 10:
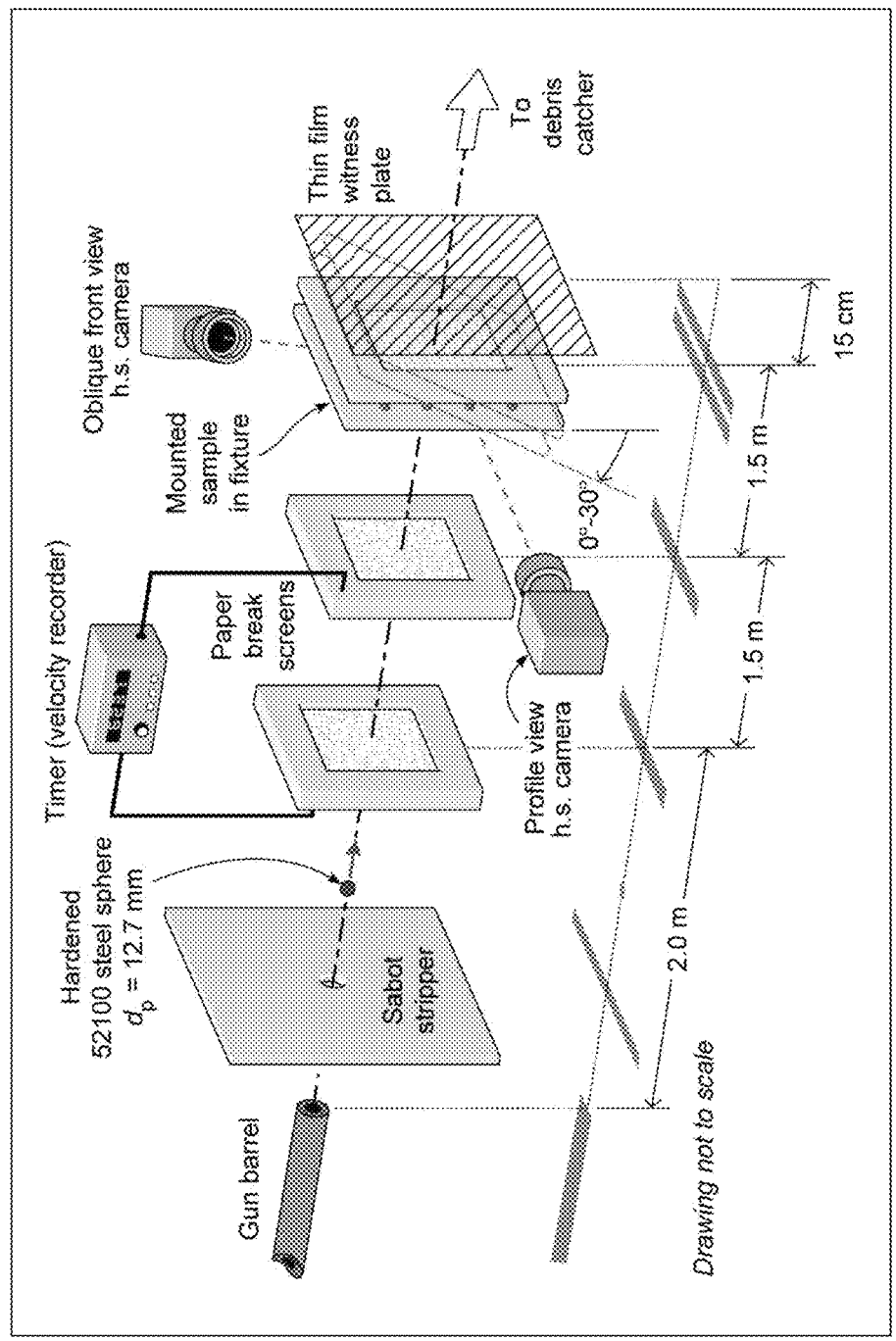
FIG. 10 is a screenshot showing the ballistic test set-up. A witness plate will be integrated at the rear of the system to satisfy FAA test requirements.
Figure 11:
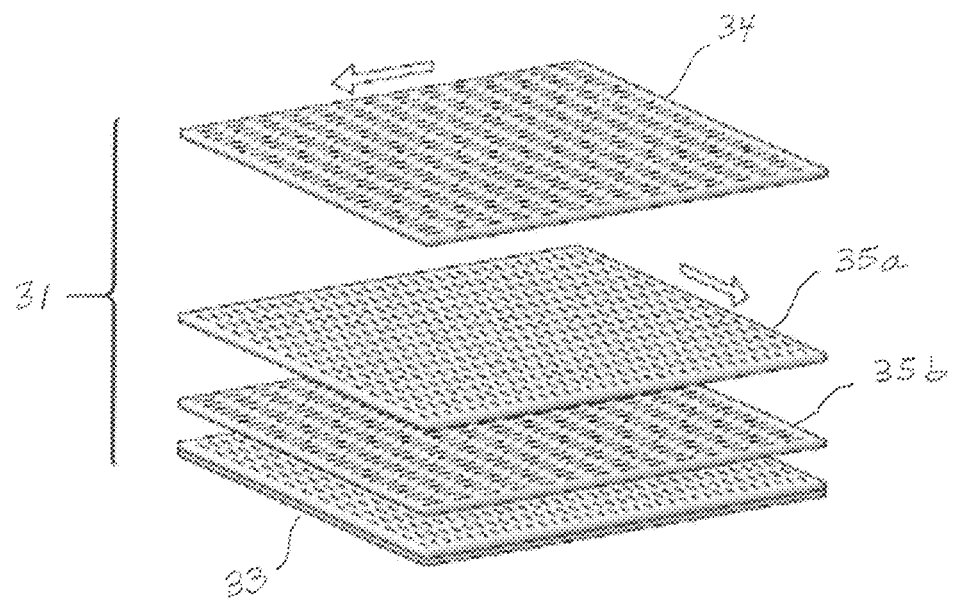
FIG. 11 schematically illustrates an exploded perspective view of molecularly oriented tape material including multiple layers of molecularly oriented fabric material. The molecularly oriented tape material may include a front face and back face with a minimum of two sets of parallel side faces (shown in FIG. 12 as reflected as 37 and 38).
Figure 12:
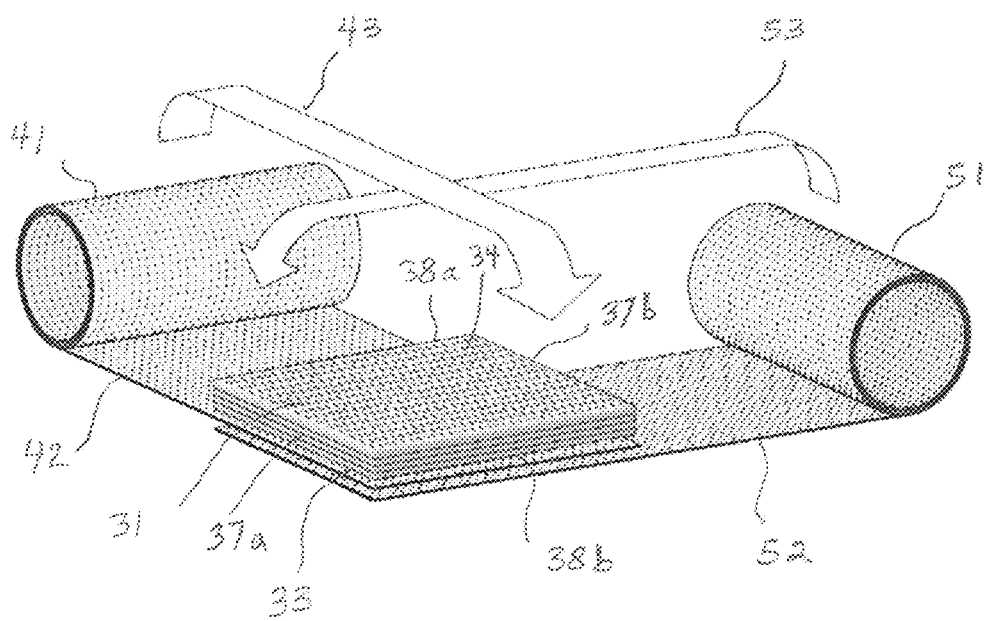
FIG. 12 schematically illustrates a perspective view of the related process of wrapping molecularly oriented fabric material around said front and back faces and a at least two sets of said parallel side faces of said molecularly oriented tape material, yielding a wrapped core structure (See FIG. 13 as reflected as 39).
Figure 13:
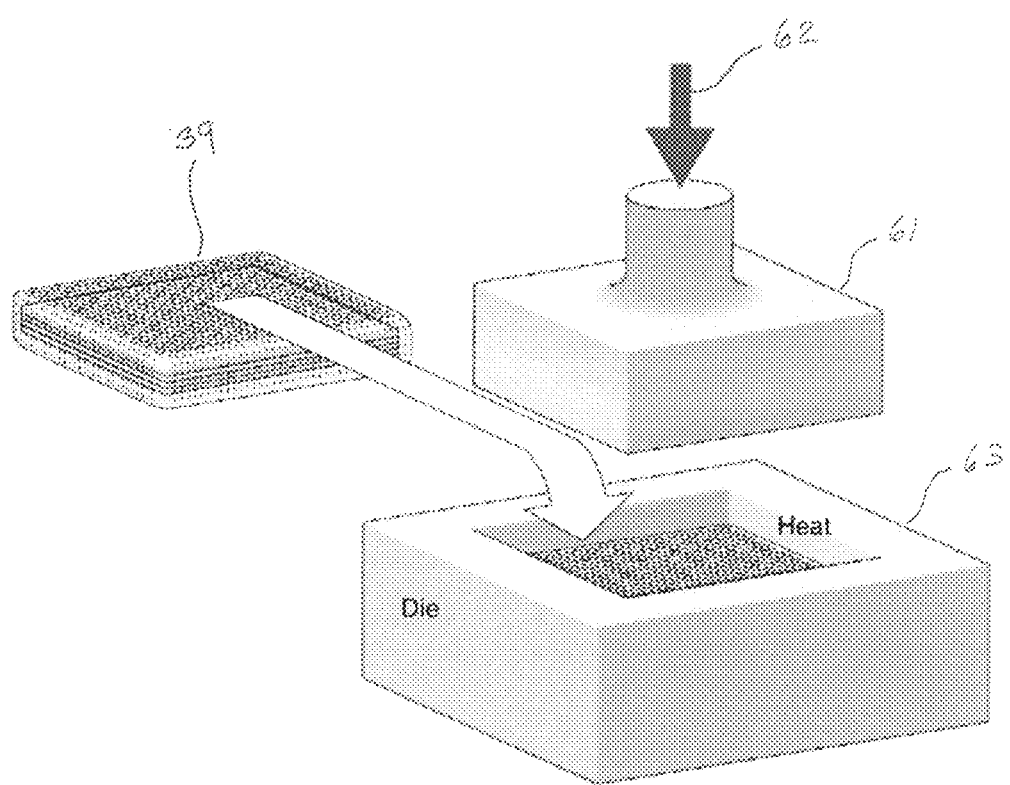
FIG. 13 schematically illustrates a perspective view of a wrapped core structure about to be processed by a hot press under pressure and an autoclave.
Figure 14:
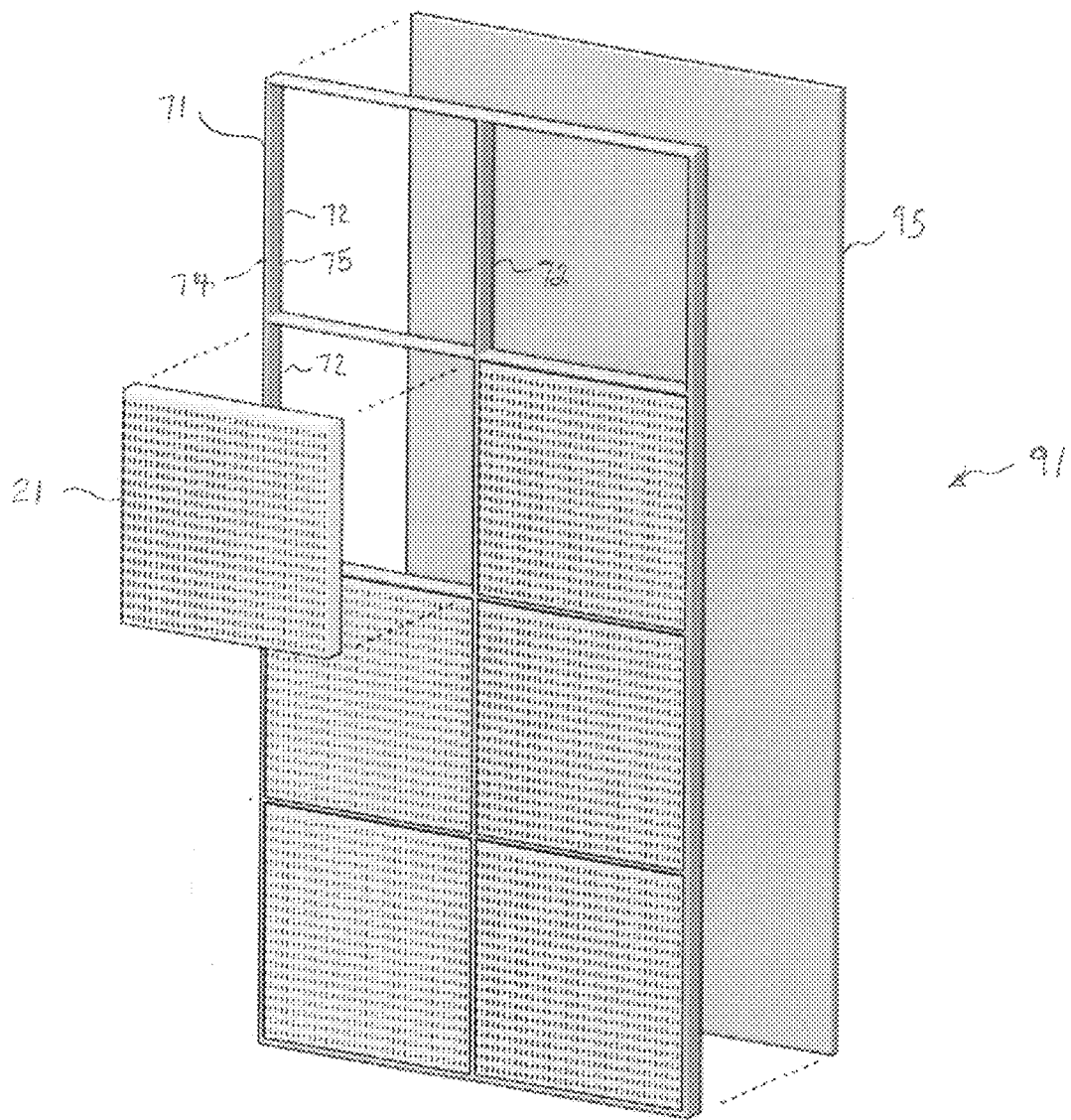
FIG. 14 schematically illustrates a perspective view of multifunction ballistic resistance system for resisting projectiles and/or mitigating blast effects of explosions. The multifunction ballistic resistance system may comprise at least one cellular frame defining cells therein. The cellular frame includes a top and a bottom. The multifunction ballistic resistance system may further comprise a plurality of molecularly oriented tape material core structures wrapped in molecularly oriented fabric material and which have been finalized as ballistic resistance package. The ballistic resistance package is attached to (or in communication with) at least one cellular frame as desired or required.
Figure 15:
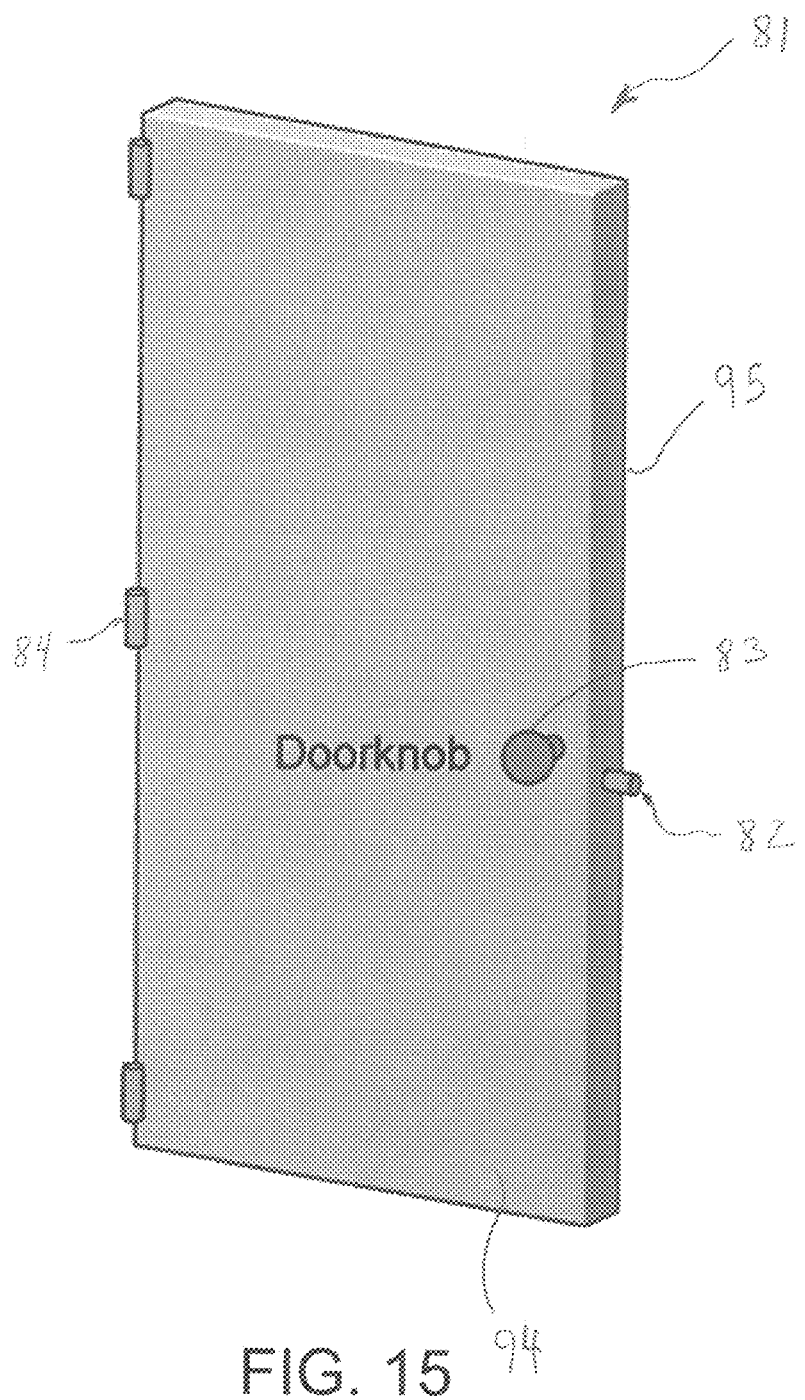
FIG. 15 schematically illustrates a perspective view the multifunction ballistic resistance system configured as a door.

FIG. 10 is a screenshot showing the ballistic test set-up. A witness plate will be integrated at the rear of the system to satisfy FAA test requirements.

Example and Experimental Results Set No. 3

The various embodiments of the structures, compositions, systems, devices, and materials discussed in the present disclosure be utilized and implemented for a number of products and services. For instance, it should be appreciated the following provides a non-limiting list of examples that represent embodiments that are considered part of the present invention and may, of course, be employed within the context of the invention other than with a door (or in addition to a door or the like).

1. Heat Pipe System, structures, or devices,
2. Heat Sink system, structures, or devices,
3. Thermal Management Systems (TMS),
4. Ballistic resistant and mitigation devices, structures, and systems, 5. Projectile resistant and mitigation devices, structures, and systems,
6. Missile resistant and mitigation devices, structures, and systems,
7. Blast resistant and mitigation devices, structures, and systems,
8. Heat resistant devices, structures, and systems,
9. Electrical insulating devices, structures, and systems,
10. Armor plating system, device, or structure,
11. Tank plating system, device, or structure,
12. Armor system, device, or structure,
13. Lattice structure (for example, but not limited thereto, tetrahedral, pyramidal, three-dimension kagome, kagome, or any combination thereof),
14. Cellular structure,
15. Corrugation structure (for example, but not limited thereto, triangular, diamond, multilayered, flat-top, Navtruss, or any combination thereof),
16. Honeycomb structure (for example, but not limited thereto, hexagonal cell, square cell, cylindrical, rectangular cell, triangular cell or any combination thereof),
17. Panel structure,
18. Face layer,
19. Sandwich structure,
20. Modular layer structure or multilayer component,
21. Multifunctional structure or component,
22. Smart memory alloy (SMA) system, device, or structure,
23. Textile weave structure, woven structure, mesh structure, braid structure, multilayer textile structure, or any combination thereof,
24. Architectural structure (for example: pillars, walls, shielding, foundations or floors for tall buildings or pillars, wall shielding floors, for regular buildings and houses),
25. Civil engineering field structure (for example: road facilities such as noise resistant walls and crash barriers, road paving materials, permanent and portable aircraft landing runways, permanent or portable landing pads, pipes, segment materials for tunnels, segment materials for underwater tunnels, tube structural materials, main beams of bridges, bridge floors, girders, cross beams of bridges, girder walls, piers, bridge substructures, towers, dikes and dams, guide ways, railroads, ocean structures such as breakwaters and wharf protection for harbor facilities, floating piers/oil excavation or production platforms, airport structures such as runways), military security/protection/defense structures;
26. Machine structure (for example: frame structures for carrying system, carrying pallets, frame structure for robots, etc.),
27. Automobile structure (for example: body, frame, doors, chassis, roof and floor, side beams, bumpers, etc.),
28. Ship structure (for example: main frame of the ship, body, deck, partition wall, wall, etc.),
29. Freight car structure (for example: body, frame, floor, wall, etc.),
30. Aircraft structure (for example: wing, main frame, body, floor, etc.),
31. Spacecraft structure (for example: body, frame, floor, wall, etc.),
32. Space station structure (for example: the main body, floor, wall, etc.), and
33. Submarine, ship or water craft structure (for example: body, frame, etc.).
34. Military vehicle (tank, automobile, robot, etc.),
35. Parts for marine vessel hulls or decks or parts for hovercraft, and other amphibious vehicles,
36. Frames to any air, space, or water craft, vehicle or robot,
37. Outer skin or inner skin, as well as other components, of any air, space, or water craft, vehicle or robot,
38. Any building structures or components of building structures,
39. Any automotive component, bodies, frames, chassis and components,
40. Transportation land, air, or sea vehicle, craft or robot,
41. Electronics systems or components of such electronic systems, as well as other components and housings,
42. Multifunctional system, device, or structure,
43. Struts or the like,
44. Jet Blast Deflector (JBD) system,
45. Armor suit (or portions thereof) for military personnel or other human or animal subjects,
46. Armor shield for military personnel or other human or animal subjects,
47. Armor helmet or mask (or portions thereof) for military personnel or other human or animal subjects,
48. Armor gear (or portions thereof) and accessories for military personnel or other human or animal subjects,
49. Armor suit for military robot or other types of robots,
50. Rods, bars or other elongated members,
51. I-beam, H-beam, or other beam like structures,
52. Impact resistant and mitigation devices, structures, and systems,
53. Force resistant and mitigation devices, structures, and systems.
54. Shock absorption devices, structures, and systems,
55. Crash deflection and mitigation devices, structures, and systems.

The method of providing, making or using any of the devices, systems, or structures provided in the above list (nos. 1-55), as well as any structures or systems disclosed herein, may be employed within the context of the invention.

Example and Experimental Results Set No. 4

The ballistic testing will be complimented by (occasional) X-ray computed tomography evaluations of impacted targets to measure depth of penetration and identify the mechanism of projectile defeat.

The door hinge and locking mechanism developed for the door will be subjected to shear stress testing using appropriately designed structural testing methods. The intrusion resistance of the full-scale door will also be measured using the 1,000 kN servo hydraulic testing facility.

The proposed programs can be decompose into eight tasks as follows:

Task 1: Materials selection. This task includes identification of the candidate materials for ballistic tiles, the honeycomb core and exterior parts of the door. It includes a review of export regulations (ITAR/EAR) for covering these materials. (This task would be conducted in the first 6 months)

Task 2: Single tile ballistic optimization. Using data from previous programs, a preliminary tile design with a mass per unit of 0.5 psf will be fabricated and its V50 determined for the two projectiles using the most severe 0° obliquity impact. The design will then be refined to reduce aerial density and evaluate the contribution of the front and rear door faces to ballistic resistance. (Completed after 18 months)

Task 3: Honeycomb core design. A core design will be proposed and materials and manufacturing methodologies identified. Finite element analysis will be used to ensure the concept meets the anti-intrusion requirements. This task will address robust attachment of the core to the door front and rear faces and integration of the hybrid ballistic tiles with a controlled gap between the rear of the tile and the rear door face. (Completed after 18 months)

Task 4: Sub-assembly testing. Several test panels consisting of a single square honeycomb cell containing a hybrid ballistic tile with front and rear door faces attached will be assembled. These will subjected to multi-hit testing at both 0° and 30° obliquities with both projectiles. Based upon the results, a minimum aerial density design revision will be proposed, and after Airbus review, subjected to a series of impact tests. (Completed by month 24)

Task 5: Locks and hinges. A robust design for integration of door locks and hinges will be developed using finite element analysis and experimental assessment. The goal is to meet the anti-intrusion standard without compromise to the ballistic resistance or requirement for significant additional weight. (Completed by month 24)

Task 6: Full-scale assembly. Working with Airbus engineers the team will develop an affordable manufacturing approach for the assembly of the full-scale door. Four doors will be fabricated using this route and nondestructively inspected to ensure they will perform reliably. (Completed by month 30)

Task 7: Ballistic qualification. Two of the doors will be used to perform multi-hit testing with the two projectiles at 0° and 30° obliquities and demonstrate that the doors meet the FAA specified level of ballistic performance. (Completed by Month 34)

Task 8: Anti-intrusion testing. Two of the doors will be tested to ensure the doors meet the FAA anti-intrusion level of performance. (Completed by month 34).

REFERENCES

The following patents, applications and publications as listed below and throughout this document are hereby incorporated by reference in their entirety herein. It should be appreciated that various aspects of embodiments of the present method, system, devices, article of manufacture, and compositions may be implemented with the following methods, systems, devices, article of manufacture, and compositions disclosed in the following U.S. patent applications, U.S. patents, Publications, and PCT International Patent Applications and are hereby incorporated by reference herein (and which are not admitted to be prior art with respect to the present invention by inclusion in this section):

1. Effect of Core Topology on Projectile Penetration in Hybrid Aluminum/Alumina Sandwich Structures, H. N. G. Wadley, M. R. O'Masta, K. P. Dharmasena, B. G. Compton, E. A. Gamble, and F. W. Zok, International Journal of Impact Engineering, 62, 99-113, 2013.

2. Mechanisms of Projectile Penetration in Dyneema Encapsulated Aluminum Structures, M. R. O'Masta, V. S. Deshpande, and H. N. G. Wadley, International Journal of Impact Engineering, 74, 16-35, 2014.

3. Mechanisms of the Penetration of Ultra-high Molecular Weight Polyethylene Composite Beams, J. P. Attwood, B. P. Russell, H. N. G. Wadley, V. S. Deshpande, Journal of Impact Engineering, submitted June 2015

4. Mechanisms of Penetration in Polyethylene Reinforced Cross-Ply Laminates, M. R. O'Masta, D. H. Crayton, V. S. Deshpande, H. N. G. Wadley, International Journal of Impact Engineering, 86, p. 249-264, 2015.

5. Indentation of Polyethylene Laminates by a Flat-Bottomed Cylindrical Punch, M. R. O'Masta, D. H. Crayton, V. S. Deshpande, H. N. G. Wadley, Composites Part A, In Press, November 2015.

6. The Soft Impact Response of Composite Laminate Beams", K. Karthikeyan, B. P. Russell, N. A. Fleck, M. O'Masta, H. N. G. Wadley, V. S. Deshpande, International Journal of Impact Engineering, 60, pp. 24-36, 2013.

7. A new membrane model for the ballistic impact response and V50 performance of multi-ply fibrous systems, S. L. Phoenix, and P. K. Porwal, Int J Solids Struct; 40:6723-65, 2003.

8. Dimensionless parameters for optimization of textile-based body armor systems, P. M. Cunniff, Proc. 18th Int. Symp. Ballist., San Antonio, Tex., Reinecke WG, editor, Technomic Publishing Company, Inc; p. 1303-10, 1999.

9. The Compressive Response of Ultra-high Molecular Weight Polyethylene Fibres and Composites, J. P. Attwood, N. A. Fleck, H. N. G. Wadley, V. S. Deshpande, International Journal of Solids and Structures, 71, 141-155, 2015.

10. Ballistic Impact Response of an UHMWPE Fiber Reinforced Laminate Encasing an Aluminum-Alumina Hybrid Panel, M. R. O'Masta, B. G. Compton, E. A. Gamble, F. W. Zok, V. S. Deshpande, H. N. G. Wadley, International Journal of Impact Engineering, 86, p. 131-144, 2015.

A. Impulse Transfer During Sand Impact with a Cellular Structure, Ryan L. Holloman, Vikram Deshpande, Haydn N. G. Wadley, International Journal of Impact Engineering, 82, 36-58, 2015.

B. Mechanical Response of Ti-6Al-4V Octet-Truss Lattice Structures, Liang Dong, Vikram Deshpande, Haydn Wadley, International Journal of Solids and Structures, 60-61, p. 107-124, 2015.

C. The Effect of Inclination and Stand-off on the Dynamic Response of Beams Impacted by Slugs of a Granular Material, T. Uth, H. N. G. Wadley, V. S. Deshpande, International Journal of Solids and Structures, 56-57, p. 154-174, 2015.

D. Three Dimensionally Woven Glass Fiber Composite Struts: Characterization and Mechanical Response in Tensions and Compression, Adam J. Malcom, Mark T. Aronson, Haydn N. G. Wadley, Journal of Composite Materials, DOI: 10.1177/0021998315569751, p. 1-19, 2015.

E. Impulse Transfer During Sand Impact with a Solid Block, Ryan L. Holloman, Vikram Deshpande, Haydn N. G. Wadley, International Journal of Impact Engineering, 75, p. 98-117, 2015.

F. Defect Controlled Transverse Compressive Strength of Polyethylene Fiber Laminates, MR. O'Masta, V. s. Deshpande, H. N. G. Wadley, International Journal of Solids and Structures, 5, p. 130-149, 2015.

G. The Out-of-Plane Compressive Response of Dyneema Composites, J. P. Attwood, S. N. Khaderi, K. Karthikeyan, N. A. Fleck, M. R. O'Masta, H. N. G. Wadley, V. S. Deshpande, Journal of the Mechanics and Physics of Solids, 70, p. 200-226, 2014.

H. C. C. Holland, E. A. Gamble, F. W. Zok, V. S. Deshpande and R. M. McMeeking (2015) *Effect of design on the performance of steel-alumina bilayers and trilayers subject to ballistic impact*, Mechanics of Materials, 91, 241-251.

I. J. P. Attwood, N. A. Fleck, H. N. G. Wadley and V. S. Deshpande (2015), *The compressive response of ultra-high molecular weight polyethylene fibres and composites*, International Journal of Solids and Structures, 71, 141-155.

J. C. Schneider S. Kazemahvazi, D. Zenkert and V. S. Deshpande, *Dynamic compression response of self-reinforced poly(ethylene terephthalate) composites and corrugated sandwich cores*, Composites A, 77, 96-105.

K. M. R. O'Masta, B. G. Compton, E. A. Gamble, F. W. Zok, V. S. Deshpande and H. N. G. Wadley (2015), *Ballistic impact response of an UHMWPE fiber reinforced laminate encasing an aluminium-alumina hybrid panel*, International Journal of Impact Engineering, 86, 131-144.

L. T. Uth, H. N. G. Wadley and V. S. Deshpande (2015), *The effect of inclination and stand-off on the response of beams loaded via high velocity granular slugs*, International Journal of Solids and Structures, 56-57, 154-174.

M. M. R. O'Masta, V. S. Deshpande and H. N. G. Wadley (2015), *Defect Controlled Transverse Compressive Strength of Ballistic Grade Polyethylene Fiber Laminates*, International Journal of Solids and Structures, 52, 130-149.

N. J. P. Attwood, S. Khaderi, K. Karthikeyan, N. A. Fleck, M. R. O'Masta, H. N. G. Wadley and V. S. Deshpande (2014), *Investigation of the pressure dependency of the shear strength of Dyneema composites*, Journal of the Mechanics and Physics of Solids, 70, 200-226.

O. L. St-Pierre, V. S. Deshpande and N. A. Fleck (2015), *The low velocity impact response of sandwich beams with corrugated and Y-frame cores*, International Journal of Mechanical Sciences, 91, 71-80.

P. K. Karthikeyan, B. P. Russell, N. A. Fleck. H. N. G. Wadley and V. S. Deshpande (2013), *The effect of shear strength on the impact response of laminated composite plates*, European Journal of Mechanics, A, 42, 35-53.

ADDITIONAL REFERENCES

The following patents, applications and publications as listed below and throughout this document are hereby incorporated by reference in their entirety herein. It should be appreciated that various aspects of embodiments of the present method, system, devices, article of manufacture, and compositions may be implemented with the following methods, systems, devices, article of manufacture, and compositions disclosed in the following U.S. patent applications, U.S. patents, Publications, and PCT International Patent Applications and are hereby incorporated by reference herein and co-owned with the assignee (and which are not admitted to be prior art with respect to the present invention by inclusion in this section):

U.S. patent application Ser. No. 15/303,916, Wadley, et al., "Hierarchical Cellular Materials and Method of Making and Using the Same", filed Oct. 13, 2016.

U.S. patent application Ser. No. 15/303,946, Wadley, et al., "Graphene or Carbon Nanotube Materials and Method of Making and Using the Same", filed Oct. 13, 2016.

U.S. patent application Ser. No. 15/166,856, Wadley, et al., "Multilayered Thermal and Environmental Barrier Coatings for Gas Turbine Engines and Related Method Thereof", filed May 27, 2016.

U.S. patent application Ser. No. 14/999,415, Wadley, et al., "Microstructure of Vapor Deposited Coatings on Curved Substrates and Related Method and System thereof", filed May 4, 2016.

U.S. patent application Ser. No. 14/915,135, Wadley, et al., "Lattice Materials and Structures and Related Methods Thereof", filed Feb. 26, 2016.

U.S. patent application Ser. No. 14/915,154, Wadley, et al., "Three-Dimensional Space Frames Assembled from Component Pieces and Methods for Making the Same", filed Feb. 26, 2016.

U.S. patent application Ser. No. 14/783,993, Wadley, et al., "Corrosion Resistant Metal and Metal Alloy Coatings Containing Supersaturated Concentrations of Corrosion Inhibiting Elements and Methods and Systems for Making the Same", filed Oct. 12, 2015.

International Patent Application Serial No. PCT/US2015/048684, Wadley, et al., "Impulse Mitigation Systems for Granular Media Impacts and Related Methods Thereof", filed Sep. 4, 2015.

International Patent Application Serial No. PCT/US2015/025774, Wadley, et al., "Graphene or Carbon Nanotube Materials and Method of Making and Using the Same", filed Apr. 14, 2015.

International Patent Application Serial No. PCT/US2015/025736, Wadley, et al., "Hierarchical Cellular Materials and Method of Making and Using the Same", filed Apr. 14, 2015.

International Patent Application Serial No. PCT/US2014/052899, Wadley, et al., "Lattice Materials and Structures and Related Methods Thereof", filed Aug. 27, 2014.

International Patent Application Serial No. PCT/US2014/052936, Wadley, et al., "Three-Dimensional Space Frames Assembled from Component Pieces and Methods for Making the Same", filed Aug. 27, 2014.

International Patent Application No. PCT/US2014/033821 entitled "Corrosion Resistant Metal and Metal Alloy Coatings Containing Supersaturated Concentrations of Corrosion Inhibiting Elements and Methods and Systems for Making the Same," filed Apr. 11, 2014.

U.S. patent application Ser. No. 13/640,259 entitled "Multi-Functional Hybrid Panel for Blast and Impact Mitigation and Method of Manufacture," filed Oct. 9, 2012; U.S. Patent Application Publication No. 2013/0263727, Oct. 10, 2013.

International Patent Application No. PCT/US2011/031592 entitled "Multi-Functional Hybrid Panel for Blast and Impact Mitigation and Method of Manufacture," filed Apr. 7, 2011.

U.S. patent application Ser. No. 13/522,264 entitled "Multifunctional Thermal Management System and Related Method," filed Jul. 13, 2012; U.S. Patent Application Publication No. 2013/0014916, Jan. 17, 2013.

International Patent Application No. PCT/US2011/021121 entitled "Multifunctional Thermal Management System and Related Method," filed Jan. 13, 2011.

U.S. patent application Ser. No. 13/448,074 entitled "Manufacture of Lattice Truss Structures from Monolithic Materials," filed Apr. 16, 2012.

U.S. patent application Ser. No. 12/447,166 entitled "Manufacture of Lattice Truss Structures from Monolithic Materials," filed Apr. 24, 2009; U.S. Pat. No. 8,176,635, issued May 15, 2012.

International Patent Application No. PCT/US2007/022733 entitled "Manufacture of Lattice Truss Structures from Monolithic Materials," filed Oct. 26, 2007.

U.S. patent application Ser. No. 13/371,044 entitled "Method and Apparatus Application of Metallic Alloy Coatings," filed Feb. 10, 2012.

U.S. patent application Ser. No. 10/489,090 entitled "Method and Apparatus Application of Metallic Alloy Coatings," filed Mar. 9, 2004; U.S. Pat. No. 8,124,178, issued Feb. 28, 2012.

International Patent Application No. US02/28654 entitled "Method and Apparatus for Application of Metallic Alloy Coatings," filed Sep. 10, 2002.

U.S. patent application Ser. No. 13/337,133 entitled "Reliant Thermal Barrier Coating System and Related Methods and Apparatus of Making the Same," filed Dec. 25, 2011; U.S. Patent Application Publication No. 2012/0160166, Jun. 28, 2012.

U.S. patent application Ser. No. 11/917,585 entitled "Reliant Thermal Barrier Coating System and Related Methods and Apparatus of Making the Same," filed Dec. 14, 2007; U.S. Pat. No. 8,084,086, issued Dec. 27, 2011.

International Patent Application No. US2006/025978 entitled "Reliant Thermal Barrier Coating System and Related Methods and Apparatus of Making the Same," filed Jun. 30, 2006.

U.S. patent application Ser. No. 13/202,828 entitled "Coaxial Hollow Cathode Plasma Assisted Directed Vapor Deposition and Related Method Thereof," filed Aug. 23, 2011; U.S. Patent Application Publication No. 2011/0318498, Dec. 29, 2011.

International Patent Application No. PCT/US2010/025259 entitled "Coaxial Hollow Cathode Plasma Assisted Directed Vapor Deposition and Related Method Thereof," filed Feb. 24, 2010.

U.S. patent application Ser. No. 13/164,189 entitled "Multifunctional Periodic Cellular Solids and the Method of Making the Same," filed Jun. 20, 2011.

U.S. patent application Ser. No. 10/479,833 entitled "Multifunctional Periodic Cellular Solids and the Method of Making the Same," filed Dec. 5, 2003; U.S. Pat. No. 7,963,085, issued Jun. 21, 2011.

International Patent Application No. PCT/US2002/017942 entitled "Multifunctional Periodic Cellular Solids and the Method of Making the Same," filed Jun. 6, 2002.

International Patent Application No. PCT/US2011/035581 entitled "Spotless Arc Directed Vapor Deposition (SA-DVD) and Related Method Thereof," filed May 6, 2011.

U.S. patent application Ser. No. 12/733,160 entitled "Thin Film Battery Synthesis by Directed Vapor Deposition," filed Feb. 16, 2010; U.S. Pat. No. 8,784,512, issued Jul. 22, 2014.

International Patent Application No. PCT/US2008/073071 entitled "Thin Film Battery Synthesis by Directed Vapor Deposition," filed Aug. 13, 2008.

U.S. patent application Ser. No. 12/673,647 entitled "Synergistically-Layered Armor Systems and Methods for Producing Layers Thereof," filed Feb. 16, 2010.

International Patent Application No. PCT/US2008/073377 entitled "Synergistically-Layered Armor Systems and Methods for Producing Layers Thereof," filed Aug. 15, 2008.

U.S. patent application Ser. No. 12/673,418 entitled "Hybrid Periodic Cellular Material Structures, Systems, and Methods for Blast and Ballistic Protection," filed Feb. 12, 2010.

International Patent Application No. PCT/US2008/071848 entitled "Hybrid Periodic Cellular Material Structures, Systems, and Methods for Blast and Ballistic Protection," filed Jul. 31, 2008.

International Patent Application No. PCT/US2009/061888 entitled "Reactive Topologically Controlled Armors for Protection and Related Method," filed Oct. 23, 2009.

U.S. patent application Ser. No. 12/604,654 entitled "Interwoven Sandwich Panel Structures and Related Method Thereof," filed Oct. 23, 2009.

U.S. patent application Ser. No. 12/596,548 entitled "Heat-Managing Composite Structures," filed Oct. 19, 2009; U.S. Patent Application Publication No. 2010/0236759, Sep. 23, 2010.

International Patent Application No. PCT/US2008/060637 entitled "Heat-Managing Composite Structures," filed Apr. 17, 2008.

U.S. patent application Ser. No. 12/301,916 entitled "Method and Apparatus for Jet Blast Deflection," filed Oct. 7, 2009; U.S. Pat. No. 8,360,361, issued Jan. 29, 2013.

International Patent Application No. PCT/US2007/012268 entitled "Method and Apparatus for Jet Blast Deflection," filed May 23, 2007.

U.S. patent application Ser. No. 12/479,408 entitled "Manufacture of Lattice Truss Structures from Monolithic Materials," filed Jun. 5, 2009; U.S. Pat. No. 8,650,756, issued Feb. 18, 2014.

U.S. patent application Ser. No. 12/408,250 entitled "Cellular Lattice Structures With Multiplicity of Cell Sizes and Related Method of Use," filed Mar. 20, 2009.

International Patent Application No. PCT/US2009/034690 entitled "Method for Manufacture of Cellular Structure and Resulting Cellular Structure," filed Feb. 20, 2009.

U.S. patent application Ser. No. 11/928,161 entitled "Method and Apparatus for Heat Exchange Using Hollow Foams and Interconnected Networks and Method of Making the Same," filed Oct. 30, 2007.

U.S. patent application Ser. No. 10/333,004 entitled "Heat Exchange Foam," filed Jan. 14, 2003; U.S. Pat. No. 7,401,643, issued Jul. 22, 2008.

International Patent Application No. PCT/US2001/022266 entitled "Method and Apparatus for Heat Exchange Using Hollow Foams and Interconnected Networks and Method of Making the Same," filed Jul. 16, 2001.

U.S. patent application Ser. No. 11/857,856 entitled "Active Energy Absorbing Cellular Metals and Method of Manufacturing and Using the Same," filed Sep. 19, 2007.

U.S. patent application Ser. No. 10/516,052 entitled "Active Energy Absorbing Cellular Metals and Method of Manufacturing and Using the Same," filed Nov. 29, 2004; U.S. Pat. No. 7,288,326, issued Oct. 30, 2007.

International Patent Application No. US2003/017049 entitled "Active Energy Absorbing Cellular Metals and Method of Manufacturing and Using the Same," filed May 30, 2003.

U.S. patent application Ser. No. 11/788,958 entitled "Multifunctional Battery and Method of Making the Same," filed Apr. 23, 2007; U.S. Patent Application Publication No. 2007/0269716, Nov. 22, 2007.

U.S. patent application Ser. No. 10/110,368 entitled "Multifunctional Battery and Method of Making the Same," filed Apr. 9, 2002; U.S. Pat. No. 7,211,348, issued May 1, 2007.

International Patent Application No. PCT/US2001/025158 entitled "MULTIFUNCTIONAL BATTERY AND METHOD OF MAKING THE SAME," filed Aug. 10, 2001.

U.S. patent application Ser. No. 10/584,682 entitled "Apparatus and Method for Applying Coatings onto the Interior Surfaces of Components and Related Structures Produced Therefrom," filed Jun. 28, 2006, U.S. Pat. No. 8,110,143, issued Feb. 7, 2012.

International Patent Application No. US2005/000606 entitled "Apparatus and Method for Applying Coatings onto the Interior Surfaces of Components and Related Structures Produced Therefrom," filed Jan. 10, 2005.

U.S. patent application Ser. No. 10/566,316 entitled "Method for Application of a Thermal Barrier Coating and Resultant Structure Thereof," filed Jan. 27, 2006.

International Patent Application No. US2004/024232 entitled "Method for Application of a Thermal Barrier Coating and Resultant Structure Thereof," filed Jul. 28, 2004.

U.S. patent application Ser. No. 10/545,042 entitled "Methods for Manufacture of Multilayered Multifunctional Truss Structures and Related Structures Therefrom," filed Aug. 11, 2005.

International Patent Application No. PCT/US2004/004608 entitled "Methods for Manufacture of Multilayered Multifunctional Truss Structures and Related Structures Therefrom," filed Feb. 17, 2004.

U.S. patent application Ser. No. 10/535,364 entitled "Bond Coat for a Thermal Barrier Coating System and Related Method Thereof," filed May 18, 2005.

International Patent Application No. US2003/037485 entitled "Bond Coat for a Thermal Barrier Coating System and Related Method Thereof," filed Nov. 21, 2003.

U.S. patent application Ser. No. 10/533,993 entitled "Extremely Strain Tolerant Thermal Protection Coating and Related Method and Apparatus Thereof," filed May 5, 2005.

International Patent Application No. US2003/036035 entitled "Extremely Strain Tolerant Thermal Protection Coating and Related Method and Apparatus Thereof," filed Nov. 12, 2003.

U.S. patent application Ser. No. 10/526,416 entitled "Blast and Ballistic Protection Systems and Methods of Making Same," filed Mar. 2, 2005; U.S. Pat. No. 7,913,611, issued Mar. 29, 2011.

International Patent Application No. US2003/027605 entitled "Blast and Ballistic Protection Systems and Methods of Making Same," filed Sep. 3, 2003.

U.S. patent application Ser. No. 10/526,296 entitled "Method for Manufacture of Truss Core Sandwich Structures and Related Structures Thereof," filed Mar. 1, 2005; U.S. Pat. No. 7,424,967, issued Sep. 16, 2008.

International Patent Application No. US2003/027606 entitled "Method for Manufacture of Truss Core Sandwich Structures and Related Structures Thereof," filed Sep. 3, 2003.

U.S. patent application Ser. No. 10/522,068 entitled "Method for Manufacture of Cellular Materials and Structures for Blast and Impact Mitigation and Resulting Structure," filed Jan. 21, 2005.

International Patent Application No. PCT/US2003/023043 entitled "Method for Manufacture of Cellular Materials and Structures for Blast and Impact Mitigation and Resulting Structure," filed Jul. 23, 2003.

U.S. patent application Ser. No. 10/522,076 entitled "Method and Apparatus for Dispersion Strengthened Bond Coats for Thermal Barrier Coatings," filed Jan. 21, 2005.

International Patent Application No. US2003/023 111 entitled "Method and Apparatus for Dispersion Strengthened Bond Coats for Thermal Barrier Coatings," filed Jul. 24, 2003.

U.S. patent application Ser. No. 10/515,572 entitled "Method for Manufacture of Periodic Cellular Structure and Resulting Periodic Cellular Structure," filed Nov. 23, 2004.

International Patent Application No. PCT/US2003/016844 entitled "Method for Manufacture of Periodic Cellular Structure and Resulting Periodic Cellular Structure," filed May 29, 2003.

U.S. patent application Ser. No. 10/512,161 entitled "Apparatus and Method for Uniform Line of Sight and Non-Line of Sight Coating at High Rate," filed Oct. 15, 2004; U.S. Pat. No. 7,718,222, issued May 18, 2010.

International Patent Application No. US2003/012920 entitled "Apparatus and Method for Uniform Line of Sight and Non-Line of Sight Coating at High Rate," filed Apr. 25, 2003.

U.S. patent application Ser. No. 10/487,291 entitled "Reversible Shape Memory Multifunctional Structural Designs and Method of Using and Making the Same," filed Feb. 20, 2004; U.S. Pat. No. 7,669,799, issued Mar. 2, 2010.

International Patent Application No. US02/27116 entitled "Reversible Shape Memory Multifunctional Structural Designs and Method of Using and Making the Same," filed Aug. 26, 2002.

U.S. patent application Ser. No. 10/476,309 entitled "Method and Apparatus for Efficient Application of Substrate Coating," filed Oct. 29, 2003; U.S. Pat. No. 7,879,411, issued Feb. 1, 2011.

International Patent Application No. PCT/US2002/013639 entitled "Method and Apparatus for Efficient Application of Substrate Coating," filed Apr. 30, 2002.

U.S. patent application Ser. No. 10/296,728 entitled "Multifunctional Periodic Cellular Solids and the Method of Making Thereof," filed Nov. 25, 2002; U.S. Pat. No. 8,247,333, issued Aug. 21, 2012.

International Patent Application No. PCT/US2001/017363 entitled "Multifunctional Periodic Cellular Solids and the Method of Making Thereof," filed May 29, 2001.

U.S. patent application Ser. No. 10/297,347 entitled "Process and Apparatus for Plasma Activated Deposition in a Vacuum," filed Nov. 21, 2002; U.S. Pat. No. 7,014,889, issued Mar. 21, 2006.

International Patent Application No. US01/16693 entitled "A Process and Apparatus for Plasma Activated Deposition In Vacuum," filed May 23, 2001.

U.S. patent application Ser. No. 10/246,018 entitled "Apparatus and Method for Intra-layer Modulation of the Material Deposition and Assist Beam and the Multilayer Structure Produced Therefrom," filed Sep. 18, 2002.

U.S. patent application Ser. No. 09/634,457 entitled "Apparatus and Method for Intra-Layer Modulation of the Material Deposition and Assist Beam and the Multilayer Structure Produced Therefrom," filed Aug. 7, 2000.

International Patent Application No. US99/13450 entitled "Apparatus and Method for Producing Thermal Barrier Coatings," filed Jun. 15, 1999.

International Patent Application No. US97/11185 entitled "Production of Nanometer Particles By Directed Vapor Deposition of Electron Beam Evaporant," filed Jul. 8, 1997.

U.S. patent application Ser. No. 08/679,435 entitled "Production of Nanometer Particles by Directed Vapor Deposition of Electron Beam Evaporant," filed Jul. 8, 1996; U.S. Pat. No. 5,736,073, issued Apr. 7, 1998.

U.S. patent application Ser. No. 08/298,614 entitled "Directed Vapor Deposition of Electron Beam Evaporant," filed Aug. 31, 1994; U.S. Pat. No. 5,534,314, issued Jul. 9, 1996.

U.S. Pat. No. 7,357,062 B2, Joynt, V., "Mine Resistant Armored Vehicle", Apr. 15, 2008.

U.S. Pat. No. 8,146,478 B2, Joynt, V., et al., "Mine Resistant Armored Vehicle", Apr. 3, 2012.

Entitled, "Vehicle with structural vent channels for blast energy and debris dissipation," Publication No. US 2012/0193940 A1; Publication date Aug. 2, 2012; application No. U.S. Ser. No. 13/066,243, filing date Apr. 8, 2011.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the claims and disclosure, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

We claim:

1. A method for manufacturing a ballistic resistance package, comprising:
providing a core comprised of a molecularly oriented tape material having a front face and back face with a minimum of two sets of parallel side faces, wherein said molecularly oriented tape material comprises ultrahigh molecular weight polyethylene (UHMWPE) or aramid molecules; and wherein:
said core of said molecularly oriented tape material further comprises a plurality of layers of tape material wherein a most outer of plurality of layers defines said front and back faces of said molecularly oriented tape material,
said core of said molecularly oriented tape material comprising a plurality of layers of tape material that occupies all of an area between said front face, said back face, and said minimum of two sets of parallel side faces so as to define a completely tape-filled area between said front face, said back face, and said minimum of two sets of parallel side faces,
wrapping molecularly oriented fabric material around said front and back faces and a set of said parallel side faces of said molecularly oriented tape material, yielding a wrapped core structure, wherein said molecularly oriented fabric material comprises ultrahigh molecular weight polyethylene (UHMWPE) or aramid molecules; and wherein:
said wrapping of the molecularly oriented tape material comprises at least two separate units of molecularly oriented fabric material wrapped in unique directions, and
finalizing the wrapped core structure to yield the ballistic resistance package.

2. The method of claim 1, wherein said finalizing the ballistic resistance package comprises one or more of the following:
consolidating the wrapped core structure by using a hot press and an autoclave; infiltration of a dry tape material with resin by vacuum assisted resin transfer molding (VARTM); applying an adhesive to prevent the wrapped core from unraveling; or sewing the end of the wrapped core to the outer wrapped surface of the wrapped core.

3. The method of claim 1, wherein the molecularly oriented tape material is in a woven, ply, pre-preg or laminate form.

4. The method of claim 1, wherein the molecularly oriented tape material comprises at least one or more of the following:
alumina, boron carbide, carbon, glass, para-aramid, Zylon, PIPD, polyamide, silicon carbide, or titanium carbide fibers.

5. The method of claim 1, further comprising inserting at least one ballistic resistance package into a cellular frame, wherein said cellular frame is configured to accommodate said ballistic resistance package inserted therein.

6. The method of claim 5, wherein said cellular frame is configured as a honeycomb lattice structure.

7. The method of claim 5, further comprising disposing said cellular frame onto a plate to form a door.

8. The method claim 5, further comprising disposing said cellular frame into a load bearing member so as to be part of said static load bearing member, wherein said loadbearing member is of any one of:
an architectural structure, a civil engineering structure, a military security/protection/defense structure, a machine structure, an automobile structure, a ship structure, a freight car structure, an aircraft structure, a spacecraft structure, a space station structure, and a submarine, structure.

9. The method of claim 1, wherein the molecularly oriented fabric material is in a woven, ply, pre-preg or laminate form.

10. The method of claim 1, wherein the molecularly oriented fabric material comprises at least one or more of the following:
alumina, boron carbide, carbon, glass, para-aramid, Zylon, PIPD, polyamide, silicon carbide, or titanium carbide fibers.

11. The method of claim 1, wherein the at least two separate units of molecularly oriented fabric material wrapped in unique directions alternate wrapping the molecularly oriented tape material sequentially.

12. The method of claim 1, wherein wrapping the molecularly oriented tape material in said molecularly oriented fabric material comprises creation of multiple layers of wrapped molecularly oriented fabric material covering the molecularly oriented tape material panel.

13. A ballistic resistance package, comprising:
a core comprised of molecularly oriented tape material having a front face and back face with a minimum of two sets of parallel side faces, and wherein said molecularly oriented tape material comprises ultrahigh molecular weight polyethylene (UHMWPE) or aramid molecules; and wherein:
said core of said molecularly oriented tape material further comprises a plurality of layers of tape material wherein a most outer of plurality of layers defines said front and back faces of said molecularly oriented tape material,
said core of said molecularly oriented tape material comprising a plurality of layers of tape material that occupies all of an area between said front face, said back face, and said minimum of two sets of parallel side faces so as to define a completely tape-filled area between said front face, said back face, and said minimum of two sets of parallel side faces,
a molecularly oriented fabric material wrapped around said front and back faces and a set of said parallel side faces of said molecularly oriented tape material, yielding a ballistic resistance package after it has been finalized, and wherein said molecularly oriented fabric material comprises ultrahigh molecular weight polyethylene (UHMWPE) or aramid molecules, and wherein:
said molecularly oriented tape material comprises at least two separate units of molecularly oriented fabric material wrapped in unique directions.

14. The ballistic resistance package of claim 13, wherein said finalized ballistic resilient package comprises one or more of the following:
a consolidation of the wrapped core structure by using a hot press and an autoclave; an infiltration of a dry tape material with resin by vacuum assisted resin transfer molding (VARTM); an application of an adhesive to prevent the wrapped cored from unraveling; or a sewn end of the wrapped core to the outer wrapped surface of the wrapped core.

15. The ballistic resistance package of claim 13, wherein said finalized ballistic resilient package comprises of at least two separate units of molecularly oriented fabric material wrapped in unique directions around different sets of parallel side faces.

16. The ballistic resistance package of claim 13, wherein the molecularly oriented tape material is in a woven, ply, pre-preg or laminate form.

17. The ballistic resistance package of claim 13, wherein the molecularly oriented tape material comprises at least one or more of the following:
alumina, boron carbide, carbon, glass, para-aramid, Zylon, PIPD, polyamide, silicon carbide, or titanium carbide fibers.

18. The ballistic resistance package of claim 13, wherein the molecularly oriented fabric material is in a woven, ply, pre-preg or laminate form.

19. The ballistic resistance package of claim 13, wherein the molecularly oriented fabric material comprises at least one or more of the following:
alumina, boron carbide, carbon, glass, para-aramid, Zylon, PIPD, polyamide, silicon carbide, or titanium carbide fibers.

20. The ballistic resistance package of claim 13, further comprises a cellular frame, said cellular frame is configured to accommodate said ballistic resistance package inserted therein.

21. The ballistic resistance package of claim 20, wherein said cellular frame is a honeycomb lattice structure.

22. The ballistic resistance package of claim 20, wherein said cellular frame is part of a door.

23. The ballistic resistance package of claim 20, wherein the cellular frame is part of a static load bearing member of any one of:
an architectural structure, a civil engineering structure, a military security/protection/defense structure, a machine structure, an automobile structure, a ship structure, a freight car structure, an aircraft structure, a spacecraft structure, a space station structure, and a submarine, structure.

24. A multifunction ballistic resistance system for resisting projectiles and /or mitigating blast effects of explosions, comprising:
at least one cellular frame defining cells therein, said at least one cellular frame with a top and a bottom,
a core comprised of a plurality of molecularly oriented tape material core structures having a front face and back face with a minimum of two sets of parallel side faces, wherein:
said core of said plurality of layers of tape material occupies all of an area between said front face, said back face, and said minimum of two sets of parallel side faces so as to define a completely tape-filled area between said front face, said back face, and said minimum of two sets of parallel side faces;
said core of said molecularly oriented tape material core structures is wrapped in molecularly oriented fabric material, yielding a wrapped core structure, wherein:
said molecularly oriented tape material is wrapped by at least two rolls of material, sequentially alternating layers of molecularly oriented fabric material from the at least two rolls of molecularly oriented fabric material, and
said yielded wrapped core structure is finalized, and attached to said at least one cellular frame, and wherein:
said molecularly oriented tape material comprises ultrahigh molecular weight polyethylene (UHMWPE) or aramid molecules, and
said molecularly oriented fabric material comprises ultrahigh molecular weight polyethylene (UHMWPE) or aramid molecules.

25. The system of claim 24, wherein said finalizing comprises one or more of the following:
a consolidation of the wrapped core structure by using a hot press and an autoclave; an infiltration of a dry tape material with resin by vacuum assisted resin transfer molding (VARTM); an application of an adhesive to prevent the wrapped core from unraveling; or a sewn end of the wrapped core to the outer wrapped surface.

26. The system of claim 24, wherein said at least one cellular frame is a honeycomb structure.

27. The system of claim 24, wherein said at least one cellular frame is a door.

28. The system of claim 24, wherein said plurality of wrapped molecularly oriented tape material core structures are disposed in respective cells of said at least one cellular frame.

29. The system of claim 24, further comprising:
at least one top plate disposed to the top of at least one said cellular frame and/or at least one bottom plate disposed to the bottom of at least one of said cellular frame.

30. The system of claim 24, wherein two of said at least one cellular frame are aligned in a stacked fashion respective to one another.

31. The system of claim 24, wherein the plurality of molecularly oriented tape material is in a woven, ply, pre-preg or laminate form.

32. The system of claim 24, wherein the plurality of molecularly oriented tape material further comprises at least one or more of the following:
alumina, boron carbide, carbon, glass, para-aramid, Zylon, PIPD, polyamide, silicon carbide, or titanium carbide fibers.

33. The system of claim 24, wherein the molecularly oriented fabric material is in a woven, ply, pre-preg or laminate form.

34. The system of claim 24, wherein the molecularly oriented fabric material comprises at least one or more of the following:
alumina, boron carbide, carbon), glass, para-aramid, Zylon, PIPD, polyamide, silicon carbide, or titanium carbide fibers.

35. The system of claim 24, wherein each of the at least two rolls of molecularly oriented fabric material wraps around the molecularly oriented tape material at least twice.

36. The system of claim 24, wherein the system is part of a static load bearing member of any one of:
an architectural structure, a civil engineering structure, a military security/protection/defense structure, a machine structure, an automobile structure, a ship structure, a freight car structure, an aircraft structure, a spacecraft structure, a space station structure, and a submarine, structure.

* * * * *